US008603193B2

(12) United States Patent
Kondou et al.

(10) Patent No.: US 8,603,193 B2
(45) Date of Patent: Dec. 10, 2013

(54) METHOD FOR PRODUCING PRISMATIC SECONDARY CELL

(75) Inventors: Takashi Kondou, Tokushima (JP); Hironobu Aratani, Tokushima (JP); Kenji Inagaki, Sumoto (JP); Yukio Asayama, Sumoto (JP); Yasuhiro Yamauchi, Sumoto (JP); Kenji Nansaka, Habikino (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 736 days.

(21) Appl. No.: 12/718,184

(22) Filed: Mar. 5, 2010

(65) Prior Publication Data
US 2010/0223780 A1 Sep. 9, 2010

(30) Foreign Application Priority Data

Mar. 5, 2009 (JP) .................................. 2009-052308
Jan. 22, 2010 (JP) .................................. 2010-012595

(51) Int. Cl.
 *H01M 10/0587* (2010.01)
 *H01M 2/26* (2006.01)
(52) U.S. Cl.
 USPC ........................................ 29/623.1; 429/161
(58) Field of Classification Search
 USPC ..................... 429/179, 160–162; 219/92–94
 See application file for complete search history.

(56) References Cited

U.S. PATENT DOCUMENTS

| 3,665,145 | A | * | 5/1972 | Engel | 219/119 |
| 5,856,041 | A | * | 1/1999 | Inoue et al. | 429/182 |
| 6,071,638 | A | * | 6/2000 | Fradin | 429/94 |
| 2005/0202318 | A1 | * | 9/2005 | Satori et al. | 429/231.8 |
| 2005/0287431 | A1 | | 12/2005 | Cho | |
| 2005/0287435 | A1 | * | 12/2005 | Kim | 429/174 |
| 2006/0040176 | A1 | * | 2/2006 | Ling et al. | 429/160 |
| 2006/0093910 | A1 | * | 5/2006 | Yoon et al. | 429/209 |
| 2006/0127751 | A1 | * | 6/2006 | Woo | 429/128 |

(Continued)

FOREIGN PATENT DOCUMENTS

| JP | 2002-164035 A | 6/2002 |
| JP | 2002-184451 A | 6/2002 |

(Continued)

OTHER PUBLICATIONS

JP 2005216825 A Machine Translation.*

Primary Examiner — Maria J Laios
Assistant Examiner — Robert S Carrico
(74) Attorney, Agent, or Firm — Westerman, Hattori, Daniels & Adrian, LLP

(57) ABSTRACT

A method for producing a prismatic secondary cell housing a flat electrode assembly includes disposing a first current-collecting member onto a first to-be-welded portion at a flat portion of an edge of the electrode assembly where a core-body exposed portion of the first electrode protrudes. A first receiving member is disposed onto a plane opposing the flat portion. The first current-collecting member, the core-body exposed portion, and the first receiving member are resistive-welded with the core-body exposed portion between the other members. A second current-collecting member is disposed onto a second to-be-welded portion at a position of the flat portion distanced from the first to-be-welded portion while avoiding contact between the collecting members. A conductive connecting member is placed between the collecting members or between the receiving members. The conductive connecting member and its abutting members are welded. One of the members is electrifically connected to an external output terminal.

19 Claims, 24 Drawing Sheets

(56) References Cited

U.S. PATENT DOCUMENTS

2007/0117009 A1* 5/2007 Yamauchi et al. ............ 429/160
2008/0248386 A1* 10/2008 Obrovac et al. .............. 429/209
2009/0104525 A1* 4/2009 Nakagawa et al. ........... 429/209

FOREIGN PATENT DOCUMENTS

| JP | 2003197174 A | * | 7/2003 |
| JP | 2005216825 A | * | 8/2005 |
| JP | 2006-12830 A | | 1/2006 |

* cited by examiner (a)

(b)

(a)

(b)

(a)

(b)

(c)

(a)

(b)

(a)

(b)

(a)

(b)

METHOD FOR PRODUCING PRISMATIC SECONDARY CELL

BACKGROUND OF THE INVENTION

1. Field of the Invention

The present invention relates to a method for producing a prismatic secondary cell having a positive electrode core and a negative electrode core whose exposed portions protrude from end portions of the prismatic secondary cell. Particularly, the present invention relates to a method for producing a prismatic secondary cell having a current collection system structure that realizes stable current collection.

2. Description of the Related Art

In recent years, electric vehicles, such as hybrid vehicles, that use secondary cells as power sources are becoming popular. Electric vehicles need secondary cells of high output. Also for applications in mobile electronic devices, there is a need for further increase in output of secondary cells because developing functionality of mobile electronic devices.

To increase the output of cells, it is necessary to increase the opposed area of the positive and negative electrodes. The increase in the output of cells can be facilitated by using laminated electrode assembly structures in which a multiplicity of positive and negative electrode plates are laminated, or wound electrode assembly structures in which long positive and negative electrode plates are wound with separators therebetween, since the opposed area of the positive and negative electrodes is increased.

For stable extraction of current, high-output cells using laminated electrode assemblies and wound electrode assemblies employ such a structure that a current-collecting plate is welded onto exposed portions of the positive and negative electrode cores and connected to an external output terminal. From the fact that the larger the portions of connection between the current-collecting plate and the positive and negative electrode cores becomes, the larger the amount of current can be extracted stably, it is common practice to secure two or more portions of welding (see patent document 1).

However, if a plurality of welded portions are secured during resistive-welding, current expands in the horizontal direction of the current-collecting plate as shown in FIG. 24 and runs through previously welded portions. Such current becomes non-contributory current to welding, and thus it becomes difficult to realize flow of desired current through a desired welded portion. Meanwhile, increasing voltage for the purpose of securing a sufficient flow of current through a welded portion makes the welding unsatisfactory in quality such as by causing sputtering. Thus, the problem of wasted electrical energy arises.

Patent documents 2 and 3 propose such a technique that the current-collecting plate is divided into a plurality of members, which are then disposed on a single plane at an edge of a core body in a plane direction, and that each of the current-collecting plate pieces is attached with a welding electrode to realize a flow of current. However, with the technique of patent documents 2 and 3, since an edge of the core body and the current-collecting plate are welded together, the welding area is difficult to enlarge, making it difficult to sufficiently improve current-collecting efficiency. In addition, this involves a special technique of welding, which in turn poses the problem of degraded cell productivity.

The contents of patent document 1 (Japanese Patent Application Publication No. 2006-12830), patent document 2 (Japanese Patent Application Publication No. 2002-164035), and patent document 3 (Japanese Patent Application Publication No. 2002-184451) are herein incorporated by reference in their entirety.

SUMMARY OF THE INVENTION

Problems to be Solved by the Invention

According to a first aspect of the present invention, a method is for producing a prismatic secondary cell. The prismatic secondary cell includes: a flat electrode assembly having such a shape that a core-body exposed portion of a first electrode and a core-body exposed portion of a second electrode having a different polarity from a polarity of the first electrode protrude from a pair of opposing edges of the flat electrode assembly; a prismatic cell case housing the flat electrode assembly; a sealing plate for sealing the prismatic cell case; and an external output terminal inserted through a through hole provided in the sealing plate and protruding outwardly from an inside of the cell, the external output terminal being connected to the first electrode in a conductible manner. The method includes an A step of disposing a first current-collecting member onto a first to-be-welded portion set at a flat portion of an edge of the electrode assembly from which the core-body exposed portion of the first electrode protrudes. The first current-collecting member and the core-body exposed portion of the first electrode are resistive-welded together from a direction substantially perpendicular to a plane of the core-body exposed portion of the first electrode. In a B step, a second current-collecting member is disposed onto a second to-be-welded portion set at a position of the flat portion distanced from the first to-be-welded portion so that the first current-collecting member and the second current-collecting member do not come into contact with one another. The second current-collecting member and the core-body exposed portion of the first electrode are resistive-welded together from a direction substantially perpendicular to a plane of the core-body exposed portion of the first electrode. In a C step, after completion of the above two steps, the first current-collecting member and the second current-collecting member are connected to one another in a conductible manner.

With this configuration, before the first current-collecting member and the second current-collecting member are connected to one another in a conductible manner, resistive welding is carried out separately between the first current-collecting member and the core-body exposed portion of the first electrode and between the second current-collecting member and the core-body exposed portion. This reduces non-contributory current (current not usable for welding) flowing in the horizontal direction during the resistive welding, thus enabling electric resistive-welding of good quality to be carried out with a small amount of current.

Also with the above configuration, the external output terminal is connected to the first current-collecting member or the second current-collecting member prior to any one of the above steps, or after the step of connecting the first current-collecting member and the second current-collecting member in a conductible manner. This enables electricity to be extracted from the first electrode to the outside.

In a second aspect of the present invention, the C step in the method for producing a prismatic secondary cell according to the first aspect includes: a C-1 step of disposing a conductive connecting member onto the first current-collecting member and the second current-collecting member to connect the first current-collecting member and the second current-collecting member to one another and welding the conductive connecting member onto the first current-collecting member and the second current-collecting member; and a C-2 step of connecting the external output terminal to the first current-collecting member, the second current-collecting member, or the conductive connecting member in a conductible manner.

With this configuration, the member to collect current from the first electrode is divided into the first current-collecting member, the second current-collecting member, and the conductive connecting member. The first current-collecting member and the second current-collecting member are disposed at a position where they do not come into direct contact with one another, and the first current-collecting member and the second current-collecting member are resistive-welded onto the core-body exposed portion. Then, the conductive connecting member is welded onto both members to connect the members through the conductive connecting member. This configuration reduces non-contributory current (current not usable for welding) flowing in the horizontal direction during the resistive-welding of the first current-collecting member and the second current-collecting member onto the core-body exposed portion, thus enabling electric resistive-welding of good quality to be carried out with a small amount of current.

Also with the above configuration, in the C-2 step, the external output terminal is connected to at least one of the first current-collecting member, the second current-collecting member, and the conductive connecting member in a conductible manner. The current-collecting efficiency of a prismatic secondary cell that uses a flat electrode assembly depends on the state of welding connection between the core-body exposed portion and the current collecting plate. In this respect, a connection pathway to the external output terminal is not detrimental to the current-collecting stability and current-collecting efficiency. Hence, the current collection-related members may be appropriately resistive-welded onto the core-body exposed portion in any one of the A, B, C-1, and C-2 steps, and the current-collecting efficiency will not be degraded no matter what member is used for connection to the external output terminal. Thus, the C-2 step may be carried out prior to or after any one of the A through C-1 steps.

Thus, with the above configuration, prismatic secondary cells excellent in current-collecting stability and current-collecting efficiency are produced with good productivity.

Incidentally, typical examples of the above flat electrode assembly include one in which strip-form positive and negative electrode plates are wound and pressed into a flat shape. As used herein, the "flat electrode assembly" encompasses a laminate-type electrode assembly in which a plurality of positive and negative electrode plates are superposed with a separator therebetween. As used herein, the "flat portion of an edge of the electrode assembly from which the core-body exposed portion of the first electrode protrudes" refers to a portion of the flat portion of the flat electrode assembly where portions of the core-body exposed portion overlap and protrude. The flat electrode assembly resulting from pressing wound electrodes has semi-oval edges in the rotating direction and flat intermediate portions between the edges. The current-collecting system formed of the above three members, namely, the first current-collecting member, the second current-collecting member, and the conductive connecting member, corresponds to a conventional current-collector.

In a third aspect of the present invention, the method for producing a prismatic secondary cell according to the first aspect includes 2-1 through 2-4 steps in place of the A through C steps. In the 2-1 step, the first current-collecting member is disposed onto the first to-be-welded portion set at the flat portion of the edge of the electrode assembly from which the core-body exposed portion of the first electrode protrudes. A first receiving member is disposed onto a plane opposing the flat portion. The first current-collecting member, the core-body exposed portion of the first electrode, and the first receiving member are resistive-welded together with the core-body exposed portion of the first electrode held between the first current-collecting member and the first receiving member. In the 2-2 step, the second current-collecting member is disposed onto the second to-be-welded portion set at the position of the flat portion being distanced from the first to-be-welded portion so that the first current-collecting member and the second current-collecting member do not come into contact with one another. A second receiving member is disposed onto a plane opposing the flat portion. The second current-collecting member, the core-body exposed portion, and the second receiving member are resistive-welded together with the core-body exposed portion held between the second current-collecting member and the second receiving member. In the 2-3 step, a conductive connecting member is placed between the first current-collecting member and the second current-collecting member or between the first receiving member and the second receiving member. The conductive connecting member and the members abutting the conductive connecting member are welded. In the 2-4 step, the external output terminal is connected to at least one of the first current-collecting member, the second current-collecting member, the first receiving member, the second receiving member, and the conductive connecting member in a conductible manner.

In this configuration, receiving members are disposed on respective sides opposing the first current-collecting member the second current-collecting member, and the current-collecting members and corresponding receiving members are resistive-welded while sandwiching the core-body exposed portion on its upper and lower surface. Such configuration enhances the strength of the welded portions and improves the current-collecting efficiency at the same time. If no receiving members are provided for the first current-collecting member and the second current-collecting member (hereinafter occasionally referred to simply as current collection-related members), a tip of one electrode bar attaches to the welded portion of the core-body exposed portion, which creates a possibility of damage to the welded portion during removal of the electrode bar. In this respect, the above configuration eliminates such possibility.

It should be noted that the 2-4 step does not mean a step carried out lastly. Hence, similarly to the second aspect of the present invention, the 2-4 step may be carried out prior to any one of the 2-1 through 2-3 steps, or after the 2-3 step.

In a fourth aspect of the present invention, the method for producing a prismatic secondary cell according to the first aspect includes 3-1 through 3-4 steps in place of the A through C steps. In the 3-1, the first current-collecting member is disposed onto the first to-be-welded portion set at the flat portion of the edge of the electrode assembly from which the core-body exposed portion of the first electrode protrudes. A first receiving member is disposed onto a plane opposing the flat portion. The first current-collecting member, the core-body exposed portion of the first electrode, and the first receiving member are resistive-welded together with the core-body exposed portion of the first electrode held between the first current-collecting member and the first receiving member. In the 3-2 step, as the second current-collecting member, a main portion of a connecting-type second current-collecting member having an extending portion is disposed onto the second to-be-welded portion set at the position of the flat portion being distanced from the first to-be-welded portion so that the first current-collecting member and the connecting-type second current-collecting member do not come into contact with one another. The extending portion of the connecting-type second current-collecting member is disposed at the first current-collecting member in a non-contact manner. The second receiving member is disposed onto a plane opposing the flat portion at which the main portion of the connecting-type second current-collecting member is positioned. Then, the main portion of the connecting-type second current-collecting member, the core-body exposed portion, and the second receiving member are resistive-welded together with the core-body exposed portion held between the main portion of the connecting-type second current-collecting member and the second receiving member. In the 3-3 step, the extending portion of the connecting-type second current-collecting member and the first current-collecting member are brought into contact with one another. And the extending portion of the connecting-type second current-collecting member and the first current-collecting member are welded. In the 3-4 step, the external output terminal is connected to at least one of the first current-collecting member, the connecting-type second current-collecting member, the first receiving member, and the second receiving member in a conductible manner.

As used in this configuration, the "connecting-type second current-collecting member having an extending portion" refers to the second current-collecting member integrally configured with the conductive connecting member. The extending portion of the connecting-type second current-collecting member corresponds to the conductive connecting member in the first aspect of the present invention, and the main portion of the connecting-type second current-collecting member corresponds to the second current-collecting member in the first aspect. With this configuration, the use of the connecting-type second current-collecting member, which is the second current-collecting member integrally configured with the conductive connecting member, facilitates the attempt to reduce the number of parts and the number of welded portions.

Also with the above configuration, resistive-welding is carried out between the first current-collecting member and the first receiving portion and between the main portion of the connecting-type second current-collecting member and the second receiving portion with the connecting-type second current-collecting member kept away from contact with the first current-collecting member (3-1 step and 3-2 step). Then, the non-contact portions are welded into contact with one another (3-3 step). This production method reduces non-contributory current (current not usable for welding) flowing in the horizontal direction during the resistive-welding, thus enabling resistive welding of good quality to be carried out.

Similarly to the 2-4 step, the 3-4 step may be carried out prior to any one of the 3-1 through 3-3 steps, or after the 3-3 step.

Thus, the above configuration enables resistive-welding of good quality to be carried out while facilitating the attempt to reduce the number of parts and the number of welded portions. As a result, such an advantageous effect is obtained that prismatic secondary cells excellent in current-collecting stability and current-collecting efficiency are produced with good productivity. The excellent current-collecting stability means that an excellent current-collecting efficiency is maintained for a long period of time because of firm welding.

As used herein, the "non-contact disposition" refers to a state in which two members are disposed closely enough to enable a contact but no contact is made yet (a conduction cannot be made). In the configuration of the third aspect of the present invention, the term means that the extending portion of the connecting-type second current-collecting member is positioned above an edge of the first current-collecting member while avoiding direct contact between the two members.

Typical examples of the "non-contact disposition" include such a disposition that a small degree of space that can prevent a conduction is secured between the lower surface of the connecting-type second current-collecting member and the upper surface of the first current-collecting member. It is also possible to place between the opposing surfaces of the members a spacer such as an insulation film piece that can be removed with melting heat.

In a fifth aspect of the present invention, the method for producing a prismatic secondary cell according to the first aspect includes 4-1 through 4-4 steps in place of the A through C steps. In the 4-1 step, the first current-collecting member is disposed onto one surface of the first to-be-welded portion set at the flat portion of the edge of the electrode assembly from which the core-body exposed portion of the first electrode protrudes. A first receiving member is disposed onto a plane opposing the flat portion. The first current-collecting member, the core-body exposed portion of the first electrode, and the first receiving member are resistive-welded together with the core-body exposed portion of the first electrode held between the first current-collecting member and the first receiving member. In the 4-2 step, as the second current-collecting member, a main portion of a connecting-type second current-collecting member having an extending portion is disposed onto a position of the opposing plane where the first current-collecting member and the main portion of the connecting-type second current-collecting member do not overlap one another when the flat portion is viewed perspectively from a perpendicular direction. The extending portion of the connecting-type second current-collecting member is disposed at the first current-collecting member in a non-contact manner. A second receiving member serving as a receiving member for the connecting-type second current-collecting member is disposed onto the one surface. Then, the main portion of the connecting-type second current-collecting member, the core-body exposed portion, and the second receiving member are resistive-welded together with the core-body exposed portion held between the main portion of the connecting-type second current-collecting member and the second receiving member. In the 4-3 step, the extending portion of the connecting-type second current-collecting member and the first receiving member are brought into contact with one another. The extending portion of the connecting-type second current-collecting member and the first receiving member are welded. In the 4-4 step, the external output terminal is connected to at least one of the first current-collecting member, the connecting-type second current-collecting member, the first receiving member, and the second receiving member in a conductible manner.

With this configuration, the first current-collecting member is disposed on one surface of the core-body exposed portion while the connecting-type second current-collecting member is disposed on the other surface (corresponding to the surface opposing the one surface). Such configuration has the first current-collecting member and the second receiving member disposed on one surface of the core-body exposed portion and the first receiving portion and the connecting-type second current-collecting member disposed on the other surface, resulting in the extending portion of the connecting-type second current-collecting member coupled to the first receiving portion. Also with this configuration, similar advantageous effects to those of the third aspect of the present invention are obtained. In this configuration, the to-be-welded portion of the main portion of the connecting-type second current-collecting member and the second receiving member corresponds to the second to-be-welded portion.

Similarly to the 2-4 step, the 4-4 step may be carried out prior to any one of the 4-1 through 4-3 steps, or after the 4-3 step.

In a sixth aspect of the present invention, the method for producing a prismatic secondary cell according to the first aspect includes 5-1 through 5-4 steps in place of the A through C steps. In the 5-1 step, as the first current-collecting member, a main portion of a connecting-type first current-collecting member having an extending portion is disposed onto the first to-be-welded portion set at the flat portion of the edge of the electrode assembly from which the core-body exposed portion of the first electrode protrudes. A first receiving member is disposed onto a plane opposing the flat portion. The connecting-type first current-collecting member, the core-body exposed portion of the first electrode, and the first receiving member are resistive-welded together with the core-body exposed portion of the connecting-type first electrode held between the first current-collecting member and the first receiving member. In the 5-2 step, as the second current-collecting member, a main portion of a connecting-type second current-collecting member having an extending portion is disposed onto the second to-be-welded portion set at the position of the flat portion from which the core-body exposed portion of the first electrode protrudes. A second receiving portion is disposed onto a plane opposing the flat portion. The extending portion of the connecting-type first current-collecting member and the extending portion of the connecting-type second current-collecting member are superposed in a non-contact manner. Then, the main portion of the connecting-type second current-collecting member, the core-body exposed portion, and the second receiving member are resistive-welded together with the core-body exposed portion held between the main portion of the connecting-type second current-collecting member and the second receiving member. In the 5-3 step, after the 5-2 step, the extending portion of the connecting-type first current-collecting member and the extending portion of the connecting-type second current-collecting member at the superposing portions are brought into contact with one another. The superposing portions are welded. In the 5-4 step, the external output terminal is connected to at least one of the connecting-type first current-collecting member, the connecting-type second current-collecting member, the first receiving member, and the second receiving member in a conductible manner.

Similarly to the 2-4 step, the 5-4 step may be carried out prior to any one of the 5-1 through 5-3 steps, or after the 5-3 step.

This configuration also enables resistive-welding of good quality to be carried out while facilitating the attempt to reduce the number of parts and the number of welded portions, as in the third and forth aspects. Thus, prismatic secondary cells excellent in current-collecting stability and current-collecting efficiency and durable in high output discharge applications are produced with good productivity.

In a seventh aspect of the present invention, the method for producing a prismatic secondary cell according to the second aspect includes 6-1 through 6-4 steps in place of the A through C steps. In the 6-1 step, the external output terminal is inserted through the through hole of the sealing plate to connect the external output terminal to a first current-collecting member in a conductible manner. In the 6-2 step, a first to-be-welded portion is set at a flat portion of an edge of the electrode assembly from which the core-body exposed portion of the first electrode protrudes. The first current-collecting member is disposed onto the first to-be-welded portion. The first current-collecting member and the core-body exposed portion of the first electrode are resistive-welded together from a direction substantially perpendicular to a plane of the core-body exposed portion of the first electrode. In the 6-3, a second current-collecting member is disposed onto a second to-be-welded portion set at a position of the flat portion distanced from the first to-be-welded portion so that the first current-collecting member and the second current-collecting member do not come into contact with one another. The second current-collecting member and the core-body exposed portion are resistive-welded together from a direction substantially perpendicular to a plane of the core-body exposed portion. In the 6-4 step, after completion of the above steps, the first current-collecting member and the second current-collecting member are connected to one another in a conductible manner.

With this configuration, the first current-collecting member is first connected to the external output terminal. Then, this first current-collecting member is resistive-welded onto the flat portion of the edge of the electrode assembly from which the core-body exposed portion of the first electrode protrudes. This order provides good workability of cell assembly. In this regard, the connection of the external output terminal to the first current-collecting member may be a direct connection of them or may be intermediated by a conductive member. It is also possible to place a current cutoff mechanism between the external output terminal and the first current-collecting member.

In an eighth aspect of the present invention, in the method for producing a prismatic secondary cell according to the seventh aspect, a connecting-type second current-collecting member having an extending portion is used as the second current-collecting member. The 6-4 step includes resistive-welding the extending portion of the connecting-type second current-collecting member onto an upper surface of the first current-collecting member to connect the first current-collecting member and the second current-collecting member to one another in a conductible manner. Prior to the resistive-welding, an insulating film is provided onto resistive-welded side surfaces of the members excluding at least a portion of the first current-collecting member to come into contact with the first to-be-welded portion, a portion of the second current-collecting member to come into contact with the second to-be-welded portion, and a portion of the extending portion of the connecting-type second current-collecting member to be resistive-welded onto the first current-collecting member.

With this configuration, electric resistive-welding is carried out after providing an insulation film on peripheral portions (non-to-be-welded portions), which are not the to-be-welded portions of the first current-collecting member and the connecting-type second current-collecting member. Such configuration prevents wasted flow of current caused by unexpected contact between members during welding work, thus enabling resistive-welding of good quality with good workability.

In the method for producing a prismatic secondary cell according to any one of the first to eighth aspects, a core-body notched portion may be provided between the first to-be-welded portion and the second to-be-welded portion, the core-body notched portion being made by notching a laminated core-body exposed portion composed of laminated core-body exposed portions of a same polarity.

With this configuration having a core-body notched portion provided between the first to-be-welded portion and the second to-be-welded portion, welding-associated tools, such as the electrode bar for resistive-welding, an anvil and a horn used in ultrasonic welding, will not be interfered by the core body at the core-body notched portion and can be inserted down to the bottom of a constituent member (lower surface of the core-exposed portion). This drastically improves welding workability. Thus, this configuration further improves the productivity of prismatic secondary cells excellent in current-collecting efficiency and durable in high output discharge applications.

In the method for producing a prismatic secondary cell according to any one of the first to eighth aspects, the current collection-related members such as the first current-collecting member, the second current-collecting member, the conductive connecting member, the connecting-type first current-collecting member, the connecting-type second current-collecting member, the first receiving member, and the second receiving member may be made of aluminum or an aluminum alloy.

Aluminum and an aluminum alloy are materials having preferable electrical conductivity and thermal conductivity. Such nature requires a large amount of current to flow during the resistive-welding, which easily causes non-contributory current (current not usable for welding) to occur. In this respect, the method for producing a prismatic secondary cell according to the embodiments of the present invention drastically inhibits non-contributory current. Thus, even in cases of using materials made of these metal materials, the advantageous effects of the present invention are obtained to a significantly large degree.

The method for producing a prismatic secondary cell according to the embodiments of the present invention described above enables welding of good quality to be carried out with a small amount of current during resistive-welding work for attaching current-collecting members onto the electrode core-body exposed portions. Thus, the embodiments of the present invention provides the advantageous effect of producing, with good productivity, prismatic secondary cells excellent in current-collecting stability and current-collecting efficiency and usable in high output discharge applications.

DESCRIPTION OF THE EMBODIMENTS

Embodiments of the present invention will be described. It should be noted that the present invention will not be limited to the embodiments, but modifications are possible within the scope of the present invention.

(Embodiment 1)

Figure 1:
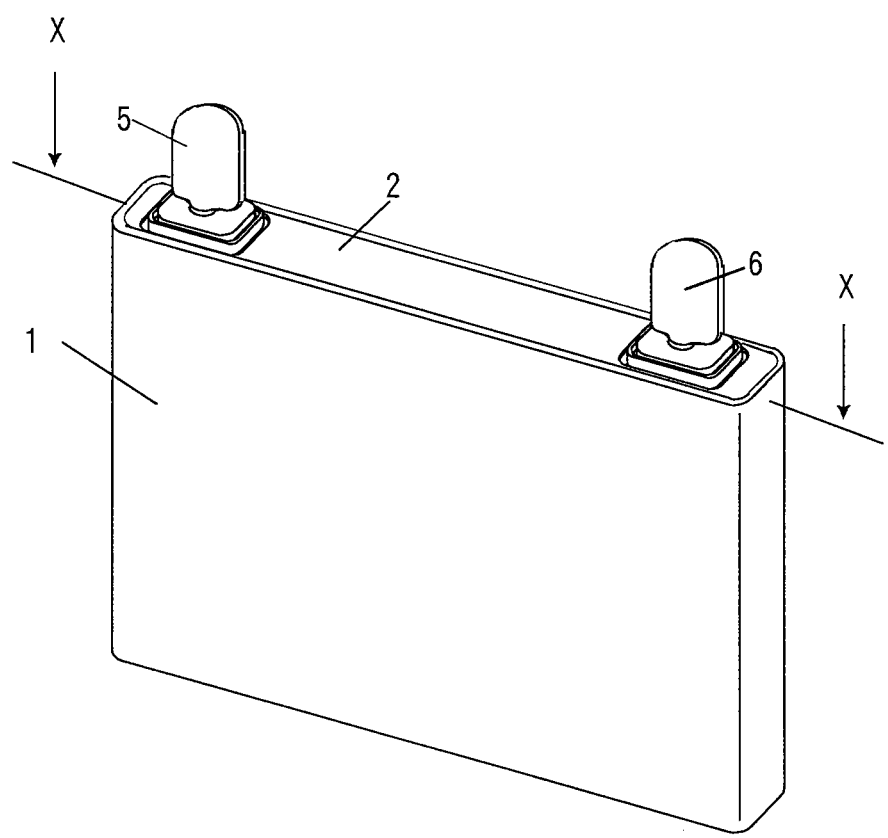
FIG. 1 is a perspective view of a prismatic secondary cell according to embodiment 1 of the present invention.
Figure 2:
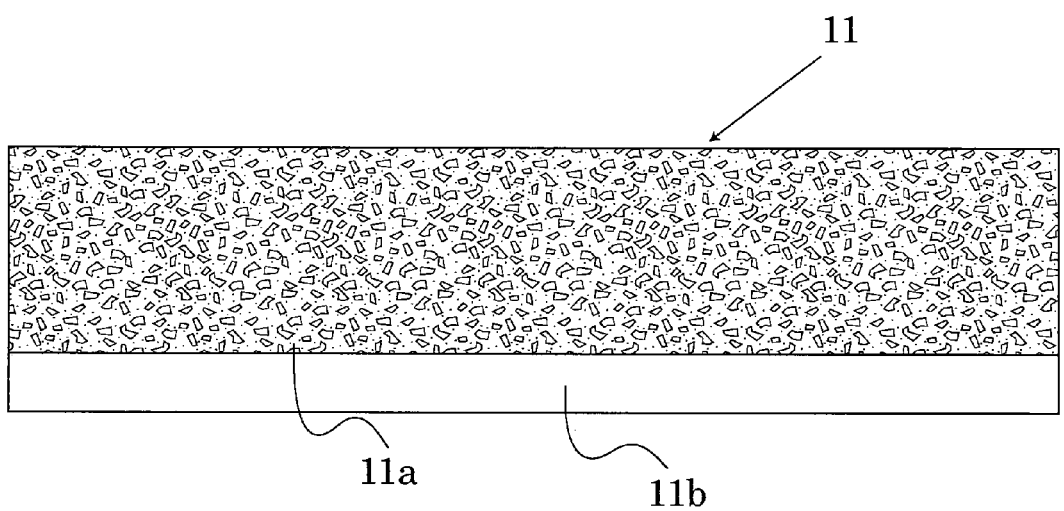
FIGS. 2A and 2B are schematic frontal views of positive and negative electrode plates according to embodiment 1 of the present invention.
Figure 2:
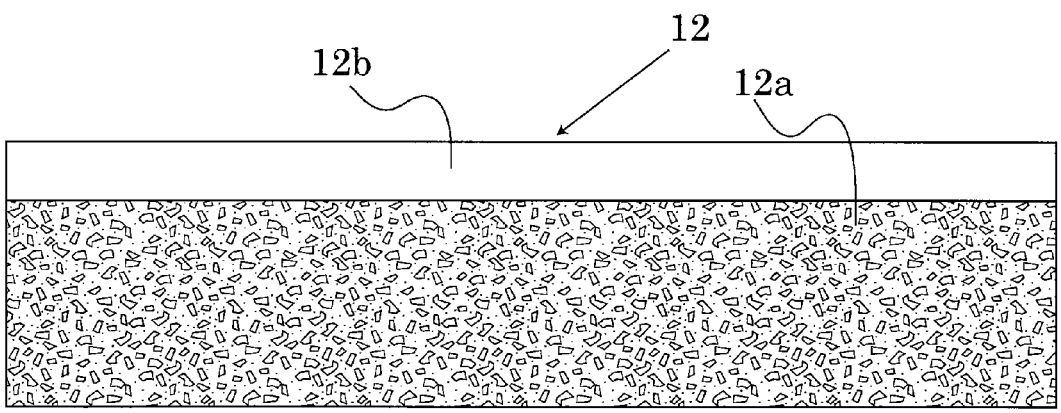

A production method according to an embodiment of the present invention applied to a prismatic lithium secondary cell will be described with reference to the drawings. FIG. 1 is a perspective view of a prismatic lithium secondary cell according to embodiment 1 of the present invention. FIGS. 2A and 2B are schematic frontal views of positive and negative electrode plates used in the prismatic lithium secondary cell according to embodiment 1 of the present invention.

As shown in FIG. 1, the prismatic lithium secondary cell according to embodiment 1 includes a prismatic cell case 1, a sealing body having a sealing plate 2 sealing an opening of the cell case 1, and a positive-electrode external output terminal 5 and a negative-electrode external output terminal 6 protruding outwardly from the sealing body.

A positive electrode plate 11 and a negative electrode plate 12 are wound with a separator such as a resin porous film of polyethylene disposed therebetween, and pressed into a flat electrode assembly 10. From edges of the electrode assembly 10, a positive-electrode core body and a negative-electrode core body protrude.

Figure 3:
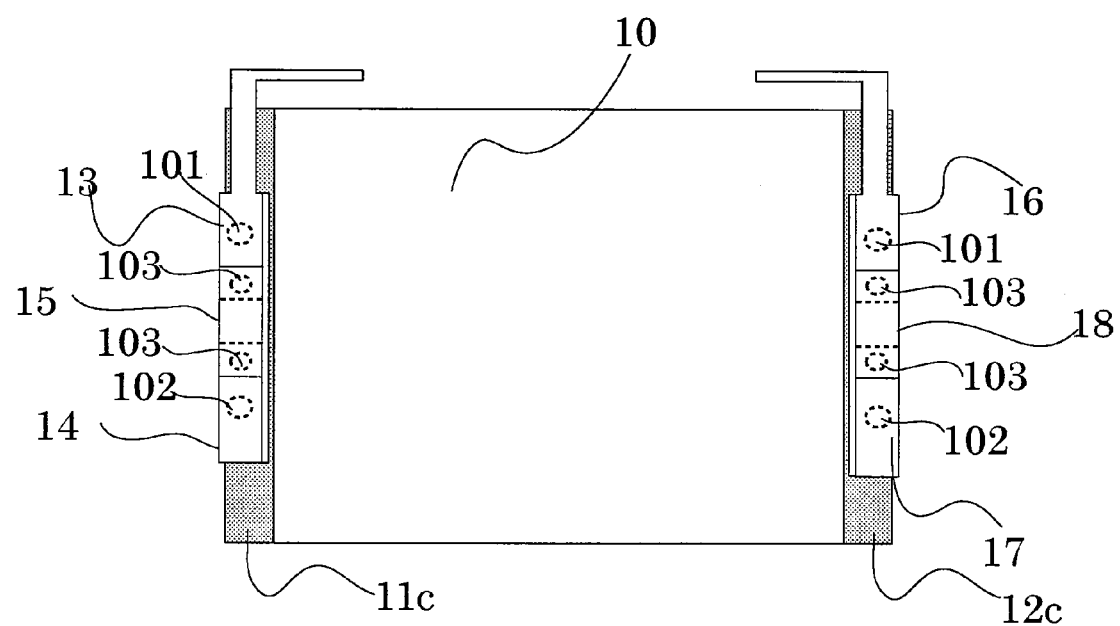
FIG. 3 is a schematic frontal view of a flat electrode assembly attached with current collection-related members.
Figure 4:
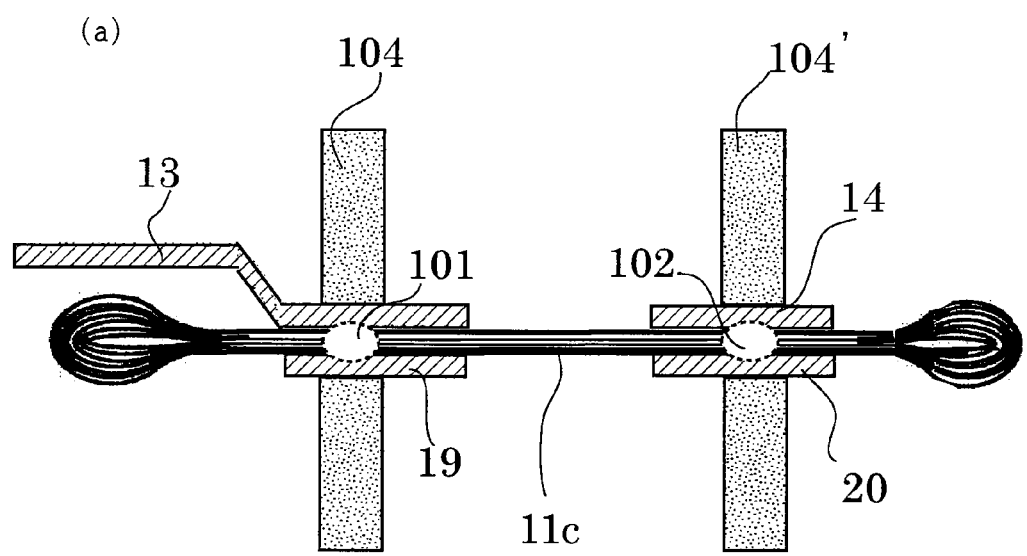
FIGS. 4A and 4B are schematic cross-sectional views showing a process of attaching the current collection-related members onto core-body exposed portions.
Figure 4:
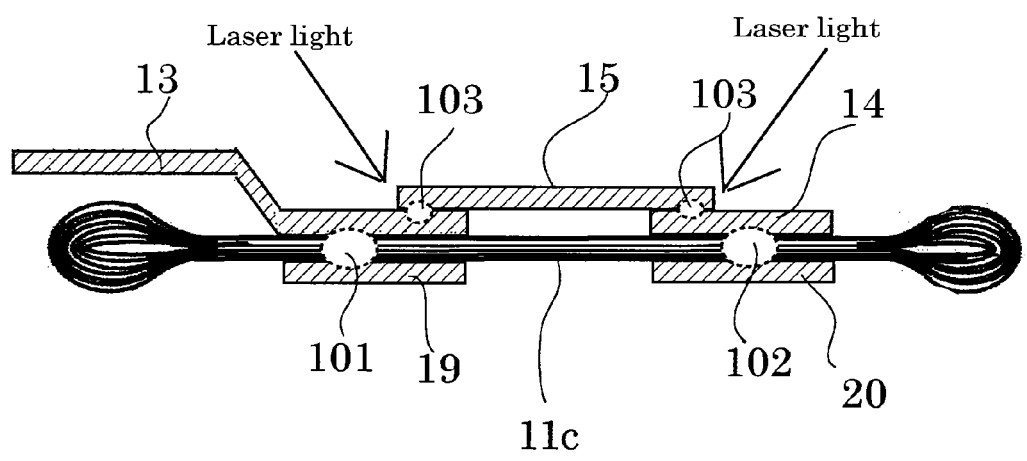

An edge surface on the positive electrode side will be described in detail. As shown in FIG. 3, a positive-electrode first current-collecting member 13 is welded onto a first to-be-welded portion 101 set a flat portion of a positive-electrode laminated core-body exposed portion 11c that protrudes from the edge surface of the flat electrode assembly 10. A positive-electrode second current-collecting member 14 is welded onto a second to-be-welded portion 102 set at a position that is distanced from the first to-be-welded portion 101. As shown in FIG. 4, the positive-electrode first current-collecting member 13 and the positive-electrode second current-collecting member 14 are disposed in a distanced manner so that opposing ends of the members 13 and 14 do not come into contact with one another.

A positive-electrode conductive connecting member 15 is disposed as if to cross the distance between the positive-electrode first current-collecting member 13 and the positive-electrode second current-collecting member 14. The positive-electrode conductive connecting member 15 is connected to the positive-electrode first current-collecting member 13 and the positive-electrode second current-collecting member 14 at welded portions 103. Thus, the positive-electrode laminated core-body exposed portion 11c, the positive-electrode first current-collecting member 13, the positive-electrode second current-collecting member 14, and the positive-electrode conductive connecting member 15 are connected to each other in a conductible manner. Further, an extended portion of the positive-electrode first current-collecting member 13 is connected to the positive-electrode external output terminal directly or through a lead wire. Such current collection structure will be hereinafter referred to as a current collection-related structure, and the members used in this structure will be referred to as current collection-related members.

After completion of the welding, the first to-be-welded portion 101 and the second to-be-welded portion 102 respectively turn into a first welded portion 101 and a second welded portion 102. In embodiment 1, the same current collection-related structure applies to the negative electrode side, and therefore description will not be repeated.

In embodiment 1, the positive-electrode core body, the positive-electrode first current-collecting member, the positive-electrode second current-collecting member, and the positive-electrode conductive connecting member are aluminum, while the members on the negative electrode side are copper.

The electrode assembly 10 having the current collection-related members attached thereto is housed in the cell case 1 together with a non-aqueous electrolyte, with a tip of the positive-electrode first current-collecting member 13 and a tip of a negative-electrode first current-collecting member 16 connected respectively to positive and negative external output terminals 5 and 6 in a conductible manner (not shown). The connection to the external output terminals may be made through a lead wire connected to an extended portion of each of the positive-electrode and negative-electrode first current-collecting member 13 and 16.

As shown in FIGS. 2A and 2B, the positive electrode plate 11 and the negative electrode plate 12 respectively have a positive-electrode active material layer 11a and a negative-electrode active material layer 12a formed on foil-like core bodies. On one edge of each active material layer along the longitudinal direction, a positive-electrode core-body exposed portion 11b and a negative-electrode core-body exposed portion 12b are formed. Such positive electrode and negative electrode plates, with a separator held therebetween, are superposed in such a manner that the positive-electrode core-body exposed portion 11b protrudes from one edge of the resulting wound electrode assembly and the negative-electrode core-body exposed portion 12b protrudes from the other edge of the resulting wound electrode assembly. Then the superposed plates are wound and pressed into a flat electrode assembly. The protruding positive-electrode core-body exposed portion 11b and negative-electrode core-body exposed portion 12b respectively turn into the positive-electrode laminated core-body exposed portion 11c and a negative-electrode laminated core-body exposed portion 12c. It is possible to form the core-body exposed portion on both edges of each active material layer along the longitudinal direction, although this may result in degradation of weight energy density.

A method for producing a prismatic lithium secondary cell of the above structure will be described in detail.

Preparation of the Positive Electrode Plate

A positive-electrode active material of lithium cobalt oxide ($LiCoO_2$), a carbon-based conductive agent such as acetylene black, graphite, or the like, and a binding agent of polyvinylidene fluoride (PVDF) were sampled at a mass ratio of 90:5:5 and dissolved in an organic agent or the like of N-methyl-2-pyrrolidone and then mixed together. Thus, a positive-electrode active material slurry was prepared.

Next, this positive-electrode active material slurry was uniformly applied onto both surfaces of a positive-electrode core body made of an aluminum foil of 20 µm thick using a die coater or a doctor blade, except that the slurry was not applied onto one edge of the positive-electrode core body along the longitudinal direction (the same edge on both surfaces of the positive-electrode core body). The non-applied edge of the positive-electrode core body was exposed to form the positive-electrode core-body exposed portion 11b.

This electrode plate was passed through a drier to remove the organic solvent. The dried electrode plate was then compressed with force to a thickness of 0.06 mm using a roll presser, thus preparing a positive electrode plate. The positive electrode plate thus prepared was cut into a strip shape of 100 mm wide. Thus, a positive electrode 11 provided with a 10 mm-wide aluminum strip as the positive-electrode core-body exposed portion 11b was obtained (FIG. 2A).

Examples of the positive-electrode active material include, other than lithium cobalt oxide, lithium-containing transition-metal complex oxides such as lithium nickel oxide (LiNiO$_2$), lithium manganese oxide (LiMn$_2$O$_4$), and lithium iron oxide (LiFeO$_2$), and oxides in which part of the transition metals contained in the foregoing oxides is substituted with other elements. These oxides may be used alone or in combination.

Preparation of the Negative Electrode

A negative-electrode active material made of artificial graphite having a volume average particle diameter of 20 μm, styrene-butadiene rubber as a binding agent, and carboxymethyl cellulose as a thickening agent were sampled at a mass ratio of 98:1:1 and mixed with an appropriate amount of water. Thus, a negative-electrode active material slurry was prepared.

Next, this negative-electrode active material slurry was uniformly applied onto both surfaces of a negative-electrode core body made of a copper foil of 12 μm thick using a die coater or a doctor blade, except that the slurry was not applied onto one edge of the negative-electrode core body along the longitudinal direction (the same edge on both surfaces of the negative-electrode core body). The non-applied edge of the negative-electrode core body was exposed to form the negative-electrode core-body exposed portion 12b.

This electrode plate was passed through a drier to remove the moist, thus preparing a dried electrode plate. Then, the dried electrode plate was compressed with force to a thickness of 0.05 mm using a roll presser, thus preparing a negative electrode plate. The negative electrode plate thus prepared was cut into a strip shape of 110 mm wide. Thus, a negative electrode 12 provided with a 8 mm-wide strip as the negative-electrode core-body exposed portion 12b was obtained (FIG. 2B).

Examples of the negative-electrode active material include, in place of or together with artificial graphite, natural graphite, carbon black, coke, glass-form carbon, carbon fiber, a carboneous material such as a baked product of any of the foregoing materials, and a mixture of the carboneous material and at least one of metal oxides that are capable of intercalation/deintercalation of lithium and a lithium alloy.

Preparation of the Electrode Assembly

The positive electrode, the negative electrode, and a separator made of a microporous film of resin (0.022 mm thick) were superposed onto each other while being positioned in such a manner that a plurality of core-body exposed portions of the same polarity were directly laminated onto each other, that core-body exposed portions of different polarities protruded in mutually opposite directions with respect to the winding direction, and that the separator intermediated between different active material layers. Then the superposed product was wound using a winder and applied with an insulation winding-end tape. The wound product was then pressed into a flat electrode assembly.

Attachment of Current Collection-Related Members

As shown in FIGS. 3, 4A, and 4B, the current collection-related members were disposed onto flat portions of the positive and negative laminated core-body exposed portions that protruded edges of the flat electrode assembly 10 in the direction orthogonal to the winding direction. FIG. 3 is a schematic frontal view of the flat electrode assembly attached with the current collection-related members. FIGS. 4A and 4B schematically show a cross-section of the positive-electrode core-body exposed portion in the direction orthogonal to the winding direction. FIG. 4A shows how resistive welding is carried out while sandwiching the positive-electrode laminated core-body exposed portion 11c between the positive-electrode first current-collecting member 13 and a first receiving member 19 and between the positive-electrode second current-collecting member 14 and a second receiving member 20. FIG. 4B shows that the positive-electrode first current-collecting member 13 and the positive-electrode second current-collecting member 14 are connected through the positive-electrode conductive connecting member 15 after the above resistive welding.

In the present specification, the aspect of the flat electrode assembly from which to view the electrode plate surfaces of the flat electrode assembly will be referred to as a front (frontal view). The aspects of the flat electrode assembly from which to view the side surfaces of the electrode assembly will be referred to as side surfaces. Thus, figures schematically showing cross-sections as viewed from the side surfaces are referred to as schematic cross-sectional views.

A specific method for attaching the current collection-related members will be described with the current collection-related structure on the positive electrode side taken as an example. First, the positive-electrode first current-collecting member 13 of aluminum (the word "positive-electrode" will be hereinafter omitted for simplicity) is disposed on a center-left side of the flat portion of the laminated core-body exposed portion 11c. On the opposite surface, the first receiving member 19 of aluminum is disposed. Tips of electrode bars 104 are brought into contact with the first current-collecting member 13 and the first receiving member 19 in such a manner that the tips of the electrode bars 104 are opposed to one another. Then current is allowed to flow between the members. Thus, the first current-collecting member 13, the laminated core-body exposed portion 11c, and the first receiving member 19 are resistive-welded together. This resistive-welded portion is the first welded portion 101, which was the first to-be-welded portion 101 before the welding.

Subsequently, the second current-collecting member 14 is disposed on a center-right side of the laminated core-body exposed portion 11c in a distanced manner so that the second current-collecting member 14 do not come into contact with an edge of the first current-collecting member 13. On the opposite surface, the second receiving member 20 is disposed. In a similar manner to the above, tips of electrode bars 104' are brought into contact with the second current-collecting member 14 and the second receiving member 20. Then current is allowed to flow between the members. Thus, the second current-collecting member 14, the laminated core-body exposed portion 11c, and the second receiving member 20 are resistive-welded together (see FIG. 4A). This resistive-welded portion is the second welded portion 102, which was the second to-be-welded portion 102 before the welding.

Further subsequently, the conductive connecting member 15 is disposed as if to cross the distance between the first current-collecting member 13 and the second current-collecting member 14. Then, the conductive connecting member 15 is laser-welded onto the first current-collecting member 13 and the second current-collecting member 14 at an overlapping portion of the conductive connecting member 15 and the first current-collecting member 13 (welded portion 103) and at an overlapping portion of the conductive connecting member 15 and the second current-collecting member 14 (welded portion 103) (see FIG. 4B). The laser welding is preferably carried out with respect to edge portions the conductive connecting member 15. These portions may also be welded by ultrasonic welding.

Similar welding work to the above was carried out for the negative electrode side.

Preparation of the Electrolytic Solution

As a non-aqueous solvent, ethylene carbonate (EC), propylene carbonate (PC), and diethyl carbonate (DEC) were mixed at a volume ratio of 1:1:8 under the conditions of 25° C. and 1 atm. As electrolytic salt, LiPF$_6$ was dissolved in the non-aqueous solvent at 1 M (mole/liter), thus preparing an electrolytic solution.

It should be noted that the non-aqueous solvent according to the present embodiment described above taking a lithium ion secondary cell as an example will not be limited to the above combination. For example, it is possible to use a combination of a high-permittivity solvent having a high lithium-salt solubility and a low-viscosity solvent. Examples of the high-permittivity solvent include ethylene carbonate, propylene carbonate, butylene carbonate, and y-butyrolactone. Examples of the low-viscosity solvent include diethyl carbonate, dimethyl carbonate, ethyl methyl carbonate, 1,2-dimethoxyethane, tetrahydrofuran, anisole, 1,4-dioxane, 4-methyl-2-pentanone, cyclohexanone, acetonitrile, propionitrile, dimethylformamide, sulfolan, methyl formate, ethyl formate, methyl acetate, ethyl acetate, propyl acetate, and ethyl propanoate. As the electrolytic salt, other than LiPF$_6$, any of LiN(C$_2$F$_5$SO$_2$)$_2$, LiN(CF$_3$SO$_2$)$_2$, LiClO$_4$, LiBF$_4$, and the like can be used alone or in combination.

Assembly of the Cell

One edge of the positive-electrode first current-collecting member 13 of the flat electrode assembly was connected to the positive-electrode external output terminal 5, and one edge of the negative-electrode first current-collecting member 16 was connected to the negative-electrode external output terminal 6. These were connected by caulking to the sealing plate 2 through an insulating gasket (not shown). Next, an electrode group 10 connected to the sealing plate 2 was inserted into the cell case 1. The sealing plate 2 was engaged with an opening portion of the cell case 1. A connection portion of the periphery of the sealing plate 2 and a connection portion of the cell case 1 were laser-welded together. From an electrolytic-solution injection aperture (not shown) set on the sealing plate 2, a predetermined amount of the above electrolytic solution was injected. Then the electrolytic-solution injection aperture was sealed. Thus, the prismatic lithium ion secondary cell according to embodiment 1 was completed.

While it is necessary that at least one "first to-be-welded portion" (i.e., the first welded portion) and at least one "second to-be-welded portion" (i.e., the second welded portion) be provided, the welding between the first current-collecting member and the laminated core-body exposed portion and between the second current-collecting member and the laminated core-body exposed portion may not be limited to one portion each, and a plurality of such portions may be provided. This applies to the other embodiments described below.

(Embodiment 2)

Figure 5:
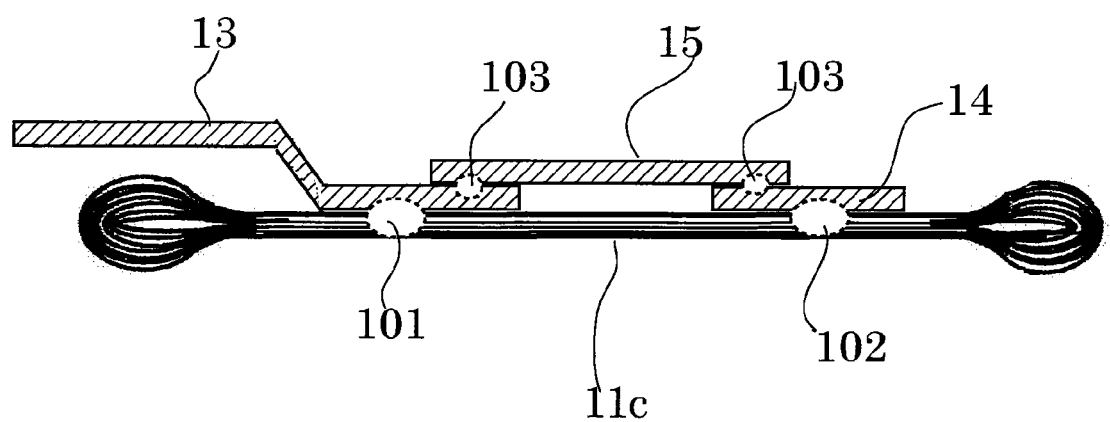
FIG. 5 is a schematic cross-sectional view of a flat electrode assembly according to embodiment 2, where no receiving portions are used.

A current collection-related structure according to embodiment 2 is shown in FIG. 5. Embodiment 2 is the same as embodiment 1 except that the receiving members 19 and 20 for respectively receiving the first current-collecting member and the second current-collecting member are not provided. In embodiment 2, the first current-collecting member and the laminated core-body exposed portion 11c are resistive-welded together by sandwiching the first current-collecting member and the laminated core-body exposed portion 11c between electrode bars to effect an electrification between the first current-collecting member and the laminated core-body exposed portion 11c. The second current-collecting member and the laminated core-body exposed portion 11c are resistive-welded together in a similar manner. Then, a predetermined portion of the conductive connecting member 15 is laser-welded.

Embodiment 2 has an advantage over embodiment 1 in that the unemployment of the receiving portions 19 and 20 reduces the number of parts. It should be noted, however, that the resistive welding bars come into direct contact with the laminated core-body exposed portion 11c, without intervention of the receiving members, which is disadvantageous in that the laminated core-body exposed portion 11c, which is made of a thin film, can be easily damaged.

(Embodiment 3)

Figure 6:
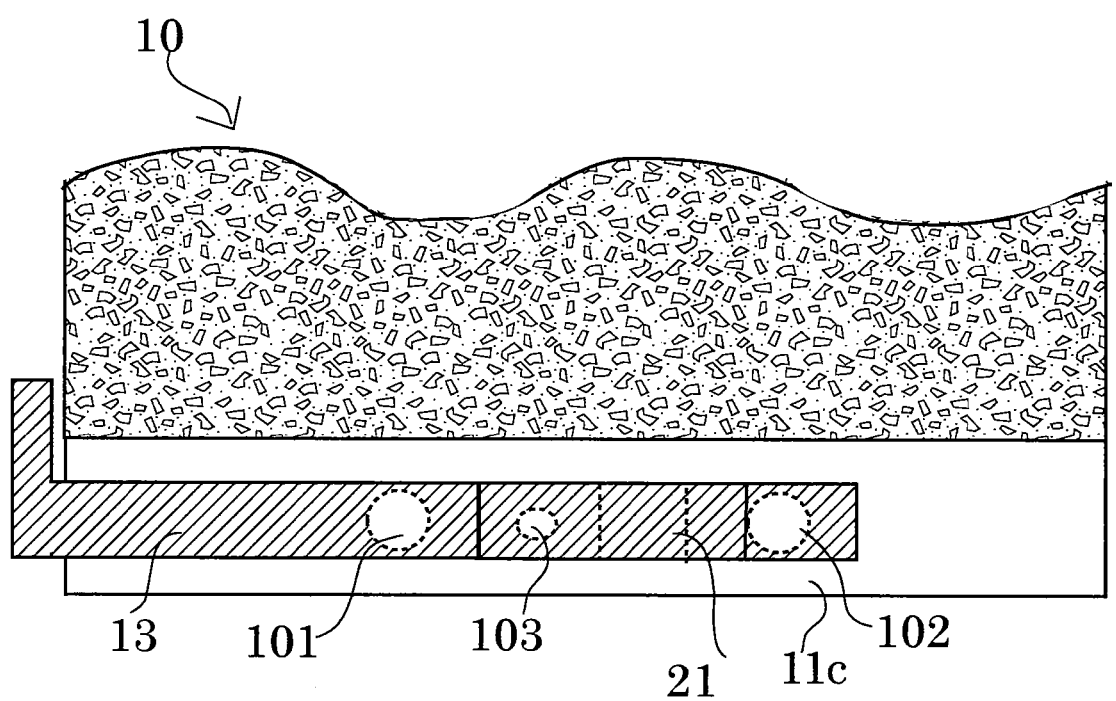
FIG. 6 is a schematic frontal view of a flat electrode assembly according to embodiment 3.
Figure 7:
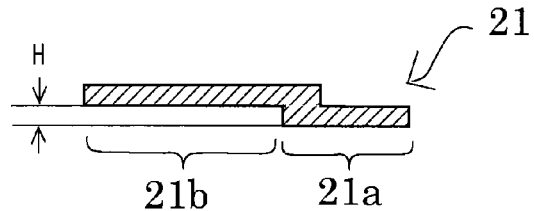
FIGS. 7A, 7B, and 7C are schematic cross-sectional views showing a process of attaching the current collection-related members according to embodiment 3, with FIG. 7A showing a connecting-type second current-collecting member, FIG. 7B showing resistive-welding work of a first to-be-welded portion and a second to-be-welded portion, and FIG. 7C showing indirect resistive-welding work of a to-be-welded portion 103.
Figure 7:
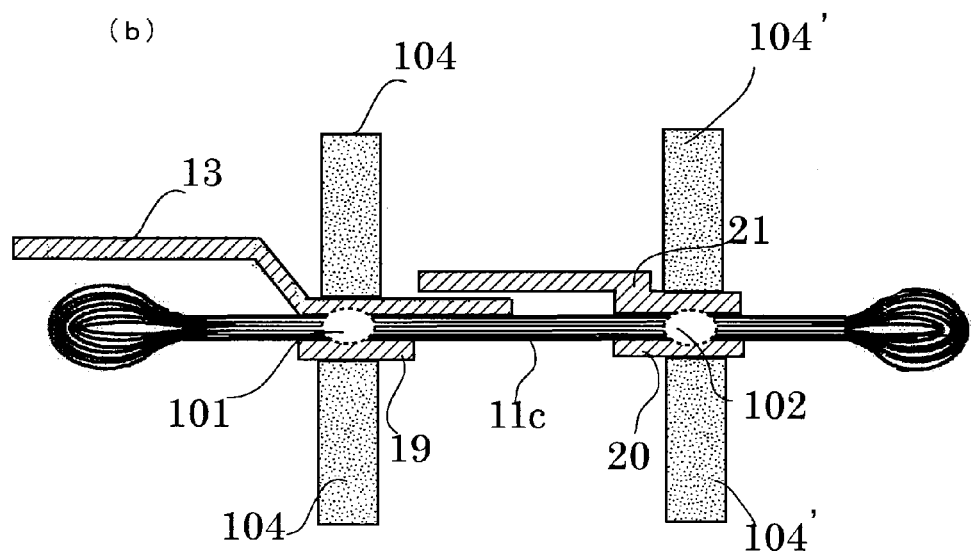
Figure 7:
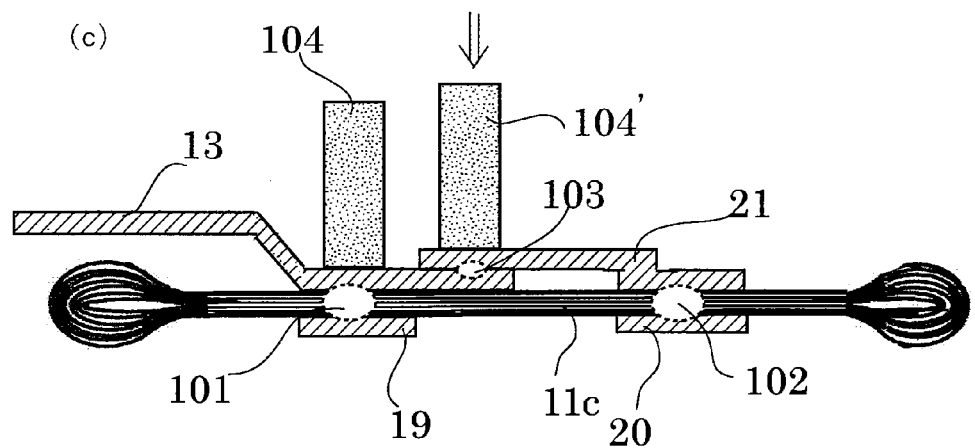

In embodiment 3, a connecting-type second current-collecting member 21 is used integrating the second current-collecting member 14 and the conductive connecting member 15 according to embodiment 1. FIG. 6 is a schematic frontal view of a current collection-related structure according to embodiment 3. FIG. 7A shows a side view of the connecting-type second current-collecting member 21. As shown in FIG. 7A, the connecting-type second current-collecting member 21 has a shape defined by a main portion 21a that corresponds to the second current-collecting member and an extending portion 21b for connection with the first current-collecting member.

Referring to FIGS. 7A through 7C, a production process of the current collection-related structure according to embodiment 3 will be described. First, similarly to embodiment 1, the first current-collecting member 13, the first receiving portion 19 for receiving the first current-collecting member 13, and the laminated core-body exposed portion 11c are resistive-welded together with the laminated core-body exposed portion 11c sandwiched between the first current-collecting member 13 and the first receiving portion 19. Then, the main portion 21a of the connecting-type second current-collecting member 21 is disposed onto the core-body exposed portion in such a manner that an edge of the first current-collecting member 13 and the main portion 21a of the connecting-type second current-collecting member 21 are distanced from one another and that an tip side of the extending portion 21b of the connecting-type second current-collecting member 21 is located above the first current-collecting member 13. In this regard, a slight degree of spacing is secured between the extending portion 21b of the connecting-type second current-collecting member 21 and the first current-collecting member 13 so that the extending portion 21b does not come into contact with an upper surface of the first current-collecting member 13 (see FIG. 7B).

An example of the method for securing a slight degree of spacing between the extending portion 21b and the first current-collecting member 13 is that a height H of the connecting-type second current-collecting member 21 from the bottom surface of the main portion 21a to the lower surface of the extending portion 21b is set to be slightly larger than the thickness of the first current-collecting member 13. Alternatively, an insulating film of resin that is thin enough to be diffusively removable by welding heat may be adhered to the lower surface of the extending portion 21b of the connecting-type second current-collecting member 21 or on a corresponding portion of the first current-collecting member.

The second receiving member 20 is disposed onto the surface opposing the main portion 21a of the connecting-type second current-collecting member 21. Then the main portion 21a, the laminated core-body exposed portion 11c, and the second receiving member 20 are resistive-welded together between the electrode bars 104 (see FIG. 7B). Then, the extending portion 21b of the connecting-type second current-collecting member 21 is pressed onto the side of the laminated core-body exposed portion 11c to bring the lower surface of the extending portion 21b into contact with the upper surface of the laminated core-body exposed portion 11c. Then an electrode bar 104' is brought into contact with the upper surface of the extending portion 21b, while an electrode bar 104 is brought into contact with a portion of the surface of the first current-collecting member in the vicinity of the electrode bar 104'. A current is allowed to flow between the electrode bars, thereby resistive-welding the lower surface of the extending portion 21b of the connecting-type second current-collecting member 21 and the upper surface of the first current-collecting member 13 (indirect resistive welding).

The welding between the lower surface of the extending portion 21b of the connecting-type second current-collecting member 21 and the upper surface of the first current-collecting member 13 may be carried out by another method of welding (e.g., laser welding). The other respects than those specified above are the same as embodiment 1.

Since in embodiment 3 there is no need for the conductive connecting member as a separate member, the attempt to reduce the number of parts and the number of welded portions is facilitated as compared with embodiment 1. Hence, productivity improves over embodiment 1.

(Embodiment 4)

Figure 8:
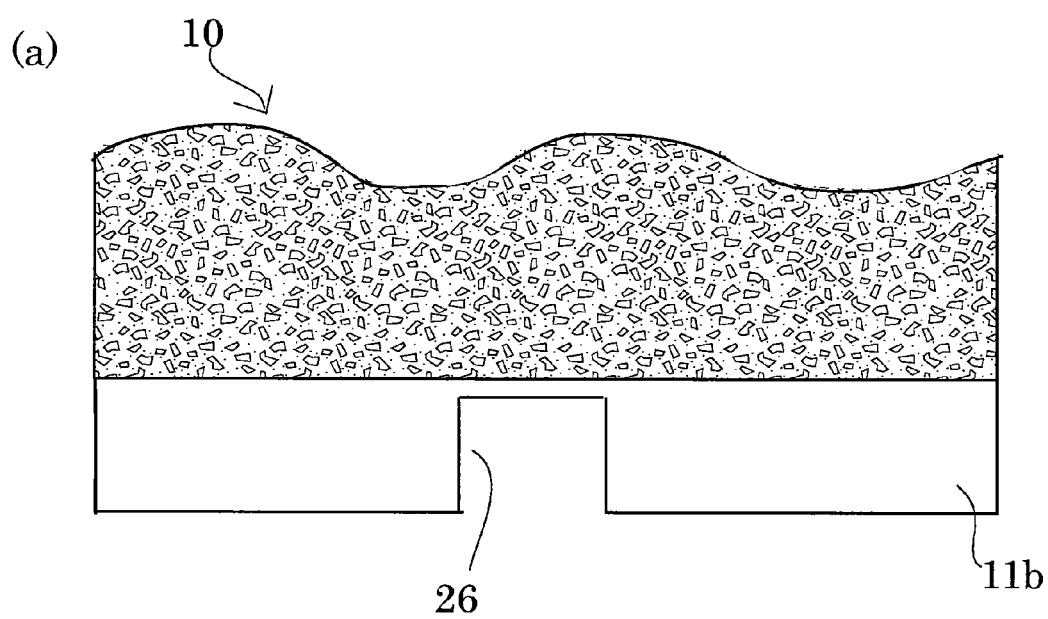
FIG. 8A is a schematic frontal view of an electrode core body formed with a notch according to embodiment 4.
FIG. 8B is a schematic side view of a flat electrode assembly having a notched portion.
Figure 8:
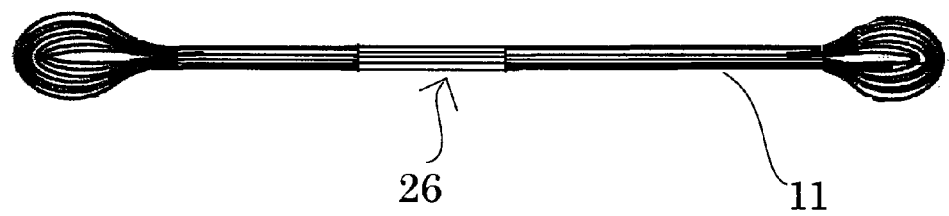
Figure 9:
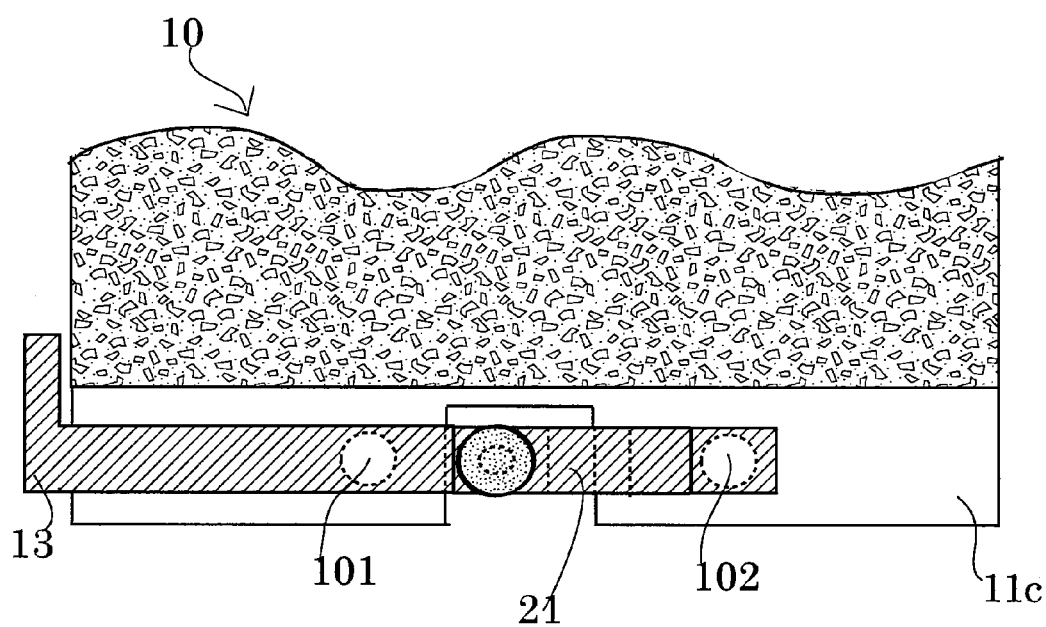
FIG. 9 is a schematic frontal view of the flat electrode assembly attached with current collection-related members according to embodiment 4.
Figure 10:
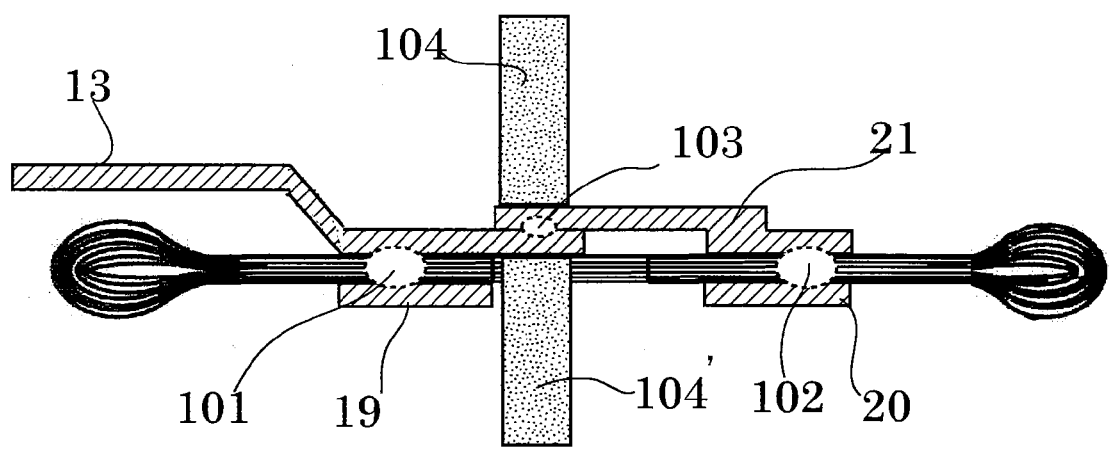
FIG. 10 is a schematic cross-sectional view showing a process of attaching the current collection-related members to the flat electrode assembly according to embodiment 4.

A current collection-related structure according to embodiment 4 is shown in FIGS. 8 through 10. FIG. 8A is a schematic frontal view of a partially notched electrode core-body exposed portion 11b. FIG. 8B is a schematic side view of a core-body notch portion 26 of the electrode core-body exposed portion 11c. FIG. 9 is a schematic frontal view of the flat electrode assembly attached with current collection-related members. FIG. 10 is a schematic cross-sectional view of such flat electrode assembly, showing a process of the resistive welding.

As shown in FIGS. 8 through 10, a feature of embodiment 4 is that the core-body notch portion 26 is formed in part of the flat portion of the laminated core-body exposed portion 11c. The configuration of the members is the same as in embodiment 3 except the feature. The production method only differs from embodiment 3 in the method of welding between the first current-collecting member 13 and the overlapping extending portion 21b of the connecting-type second current-collecting member 21.

It should be noted that the core-body notch portion 26 is not formed by notching the electrode core-body portion (electrode main-body portion) provided with the active materials, and therefore the generation capacity will not be degraded.

FIG. 10 shows featured portions related to the production method of the prismatic secondary cell according to embodiment 4. In this embodiment, since the core-body notch portion 26 is provided between the first to-be-welded portion 101 and the second to-be-welded portion 102, the electrode bar 104' will not be interfered by the laminated core-body exposed portion 11c at the core-body notch portion 26 and can be inserted down to the opposing surface. The welding work utilizing the core-body notch portion 26 is carried out in the following manner.

First, the first current-collecting member 13 is disposed onto the surface of the laminated core-body exposed portion 11c in such a manner that an edge of the first current-collecting member 13 is located above the core-body notch portion 26. Then the first receiving portion is disposed onto a portion of the opposing surface of the laminated core-body exposed portion 11c where the core-body notch portion 26 is not covered. With such state, the first to-be-welded portion 101 is resistive-welded.

Next, the connecting-type second current-collecting member 21 is disposed in such a manner that the main portion 21a of the connecting-type second current-collecting member 21 does not cover the core-body notch portion 26 and that the extending portion 21b overlaps with the edge of the first current-collecting member 13. In this arrangement, the main portion 21a of the connecting-type second current-collecting member 21 is in contact with the laminated core-body exposed portion 11c, and the extending portion 21b is not in contact with the first current-collecting member 13. Next, the second receiving member 20 is disposed onto the surface of the laminated core-body exposed portion 11c opposing the main portion 21a of the connecting-type second current-collecting member 21. Then, the main portion 21a of the connecting-type second current-collecting member 21, the laminated core-body exposed portion 11c, and the second receiving member 20 are resistive-welded together. The method of resistive welding is the same as in embodiment 3.

Next, the extending portion 21b of the connecting-type second current-collecting member 21 is pressed from upward to bring the lower surface of the extending portion 21b into contact with the upper surface of the first current-collecting member. Then an electrode bar 104 is brought into contact with the upper surface of the extending portion 21b, while an electrode bar 104' is brought into contact with the lower surface of the first current-collecting member. Then a current is allowed to flow between the electrode bars. Thus, the extending portion 21b of the connecting-type second current-collecting member 21 and the first current-collecting member are resistive-welded together. The electrode bar 104' passes through the core-body notch portion 26 and comes into contact with the lower surface of the edge of the first current-collecting member 13.

Since in embodiment 4 the connecting-type second current-collecting member 21 is used, the number of parts and the number of welded portions are reduced. Also, since the core-body notch portion 26 is used, the first current-collecting member 13 and the connecting-type second current-collecting member 21 can be sandwiched from upward and downward during the resistive welding, resulting in welding of good workability and good quality.

(Embodiment 5)

Figure 11:
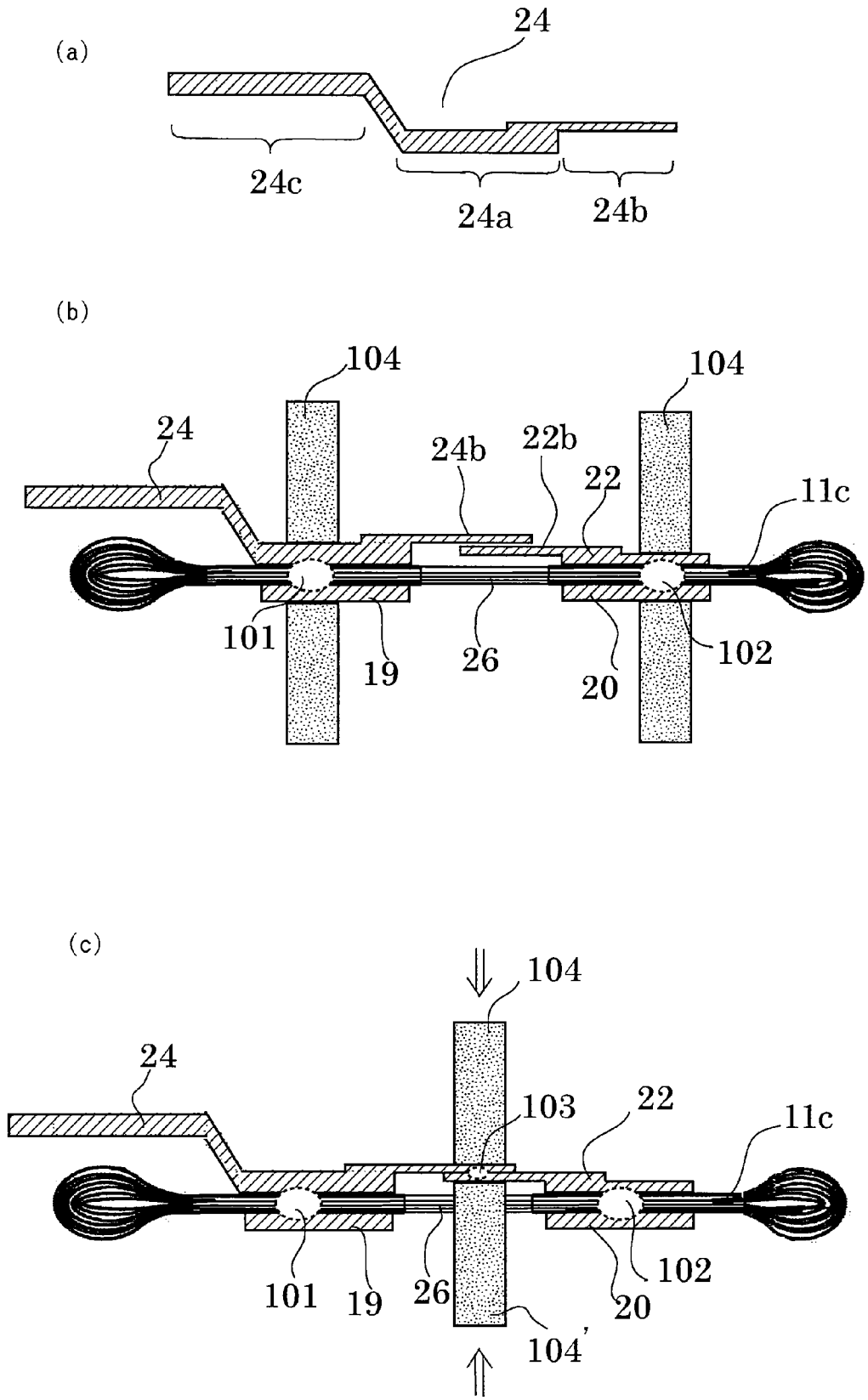
FIG. 11 are schematic cross-sectional views showing a process of attaching the current collection-related members to the flat electrode assembly according to embodiment 5, with FIG. 11A being a diagram showing a connecting-type first current-collecting member, FIG. 11B being a diagram showing resistive-welding work at a first to-be-welded portion and a second to-be-welded portion, and FIG. 11C being a diagram showing resistive-welding work at a to-be-welded portion 103.

A current collection-related structure according to embodiment 5 is shown in FIGS. 11A through 11C. As shown in FIGS. 11A through 11C, a connecting-type first current-collecting member 24 having an extending portion 24b for connecting members and a connecting-type second current-collecting member 22 having an extending portion 22b are used in embodiment 5.

Embodiment 5 differs from embodiment 4 in that the extending portions of the connecting-type first current-collecting member 24 and the connecting-type second current-collecting member 22 are made to overlap one another over the core-body notch portion 26, followed by resistive welding of the overlapping portion. The other respects than this feature are the same as embodiment 4. This embodiment provides similar advantageous effects to those in embodiment 4.

In embodiments 4 and 5, the connecting-type second current-collecting member having an extending portion is used, or the connecting-type first current-collecting member having an extending portion and the connecting-type second current-collecting member having an extending portion are used for the laminated core-body exposed portion having a core-body notch portion. It is also possible to use these connecting-type members having extending portions for a laminated core-body exposed portion without a core-body notch portion.

Also in embodiments 4 and 5, the welding of the welded portions 103 may be carried out by laser welding or ultrasonic welding, instead of resistive welding. In the cases of using laser welding or ultrasonic welding, the welding workability can be enhanced by using the core-body notch portion 26.

(Embodiment 6)

Figure 12:
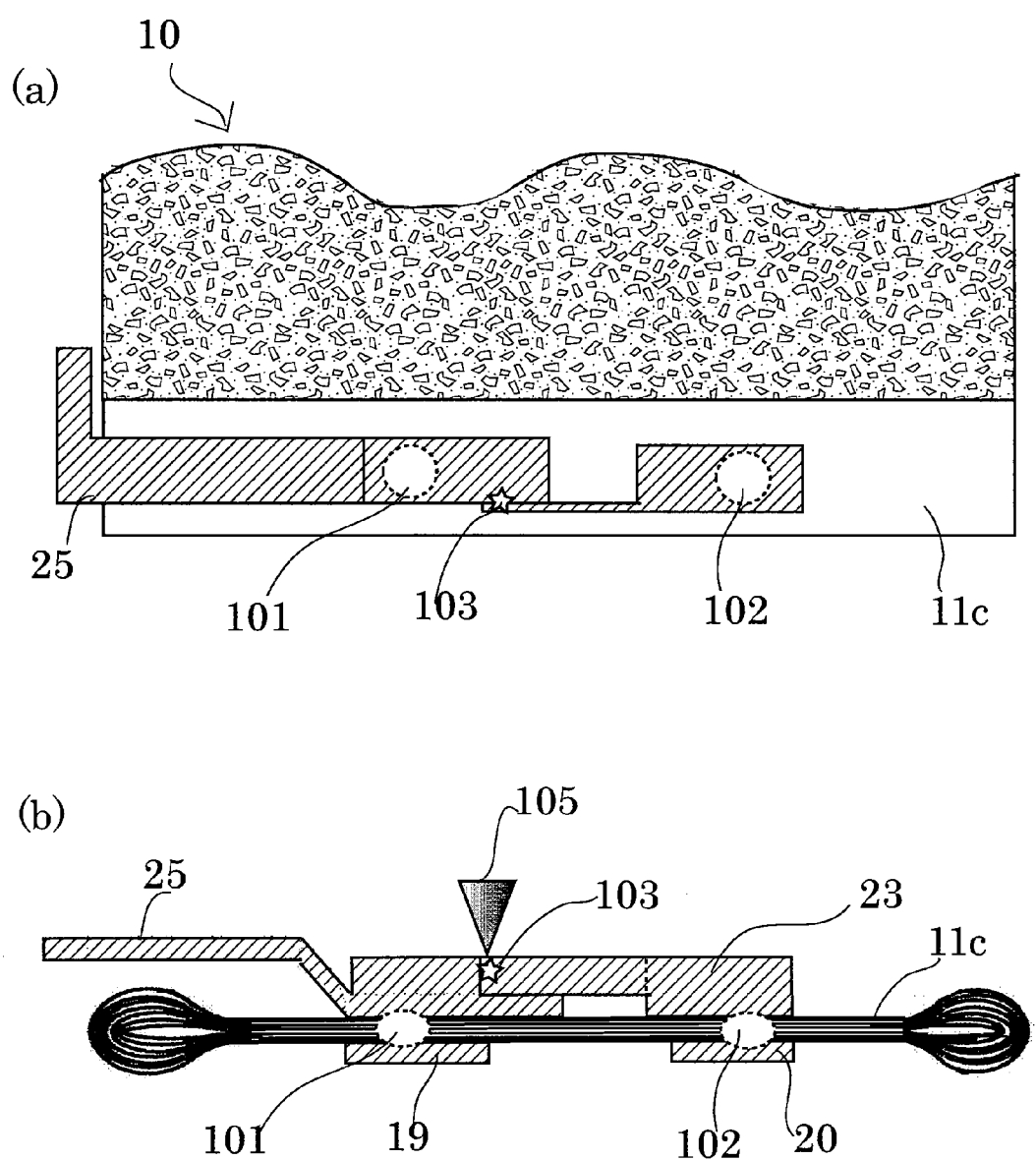
FIG. 12A is a schematic frontal view of a flat electrode assembly according to embodiment 6.
FIG. 12B is a schematic cross-sectional view of laser welding to attach current collection-related members.

A current collection-related structure according to embodiment 6 is shown in FIGS. 12A and 12B. FIG. 12A is a schematic frontal view of a flat electrode assembly 10 in which current collection-related members are disposed, and FIG. 12B is a schematic cross-sectional view of such flat electrode assembly 10, showing a process of welding. In embodiment 6, a connecting-type first current-collecting member 25 having an L-shaped shelf portion at one end, and a connecting-type second current-collecting member 23 having an extending portion that corresponds to the L-shaped shelf portion are used.

Similarly to embodiment 3, in the present embodiment, during the resistive welding of the to-be-welded portions 101 and 102 respectively for the connecting-type first current-collecting member 25 and the connecting-type second current-collecting member 23, an insulating film or the like is disposed on the shelf portion of the connecting-type first current-collecting member 25 and/or on the lower surface of the corresponding extending portion of the connecting-type second current-collecting member 23 so as to keep the members away from contact with one another and thus to prevent non-contributory current from flowing between the members. After completion of the resistive welding work of the first to-be-welded portion 101 and the to-be-welded portion 102, a laser beam of light 105 is radiated onto a boundary between the members to weld the to-be-welded portion 103. The other respects than this feature are the same as embodiment 3.

Since in this embodiment the edges of the connecting-type first current-collecting member 25 and connecting-type second current-collecting member 23 form a pair on the L surface, the state of connection is stable and the area of connection is large, thereby providing the advantage of reduced electrical resistance. The welding of the welded portion 103 may be carried out by ultrasonic welding using ultrasonic, instead of laser welding.

(Embodiment 7)

Figure 13:
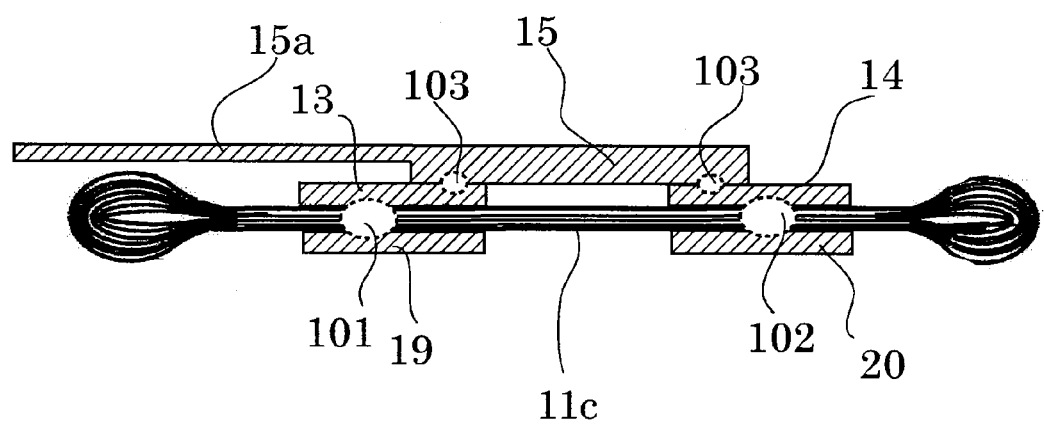
FIG. 13 is a schematic cross-sectional view of a flat electrode assembly attached with the current collection-related members according to embodiment 7.

A current collection-related structure according to embodiment 7 is shown in FIG. 13. Embodiment 7 differs from embodiment 1 in that a first current-collecting member 13 without an extending portion is used and that a conductive connecting member 15 having an extending portion 15a is used. In this embodiment, the conductive connecting member 15 having the extending portion 15a is laser-welded onto upper surfaces of the first current-collecting member 13 and the second current-collecting member 14 to connect the members to the positive-electrode external output terminal 5 in a conductible manner through the extending portion 15a of the conductive connecting member 15. Also in this embodiment, similar advantageous effects to those in embodiment 1 are obtained.

In this respect, the current-collecting members such as the first current-collecting member and the second current-collecting member preferably have a large area of contact with the core-body exposed portion in order to reduce electrical resistance. Meanwhile, the receiving members may have a smaller area than that of the current-collecting members, since the receiving members are mainly for enhancing the strength of welded portions. It should be noted, however, that even in the case where no particular difference in shape is observed between the members as shown in FIG. 13, the present specification refers to one member as a current-collecting member and the other as a receiving member, for convenience of identification of the members.

Figure 14:
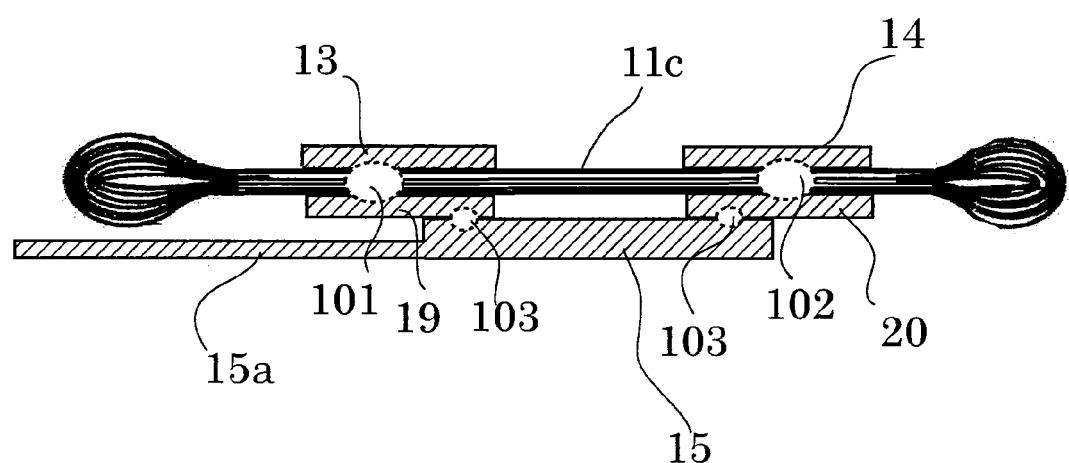
FIG. 14 is a schematic cross-sectional view showing another aspect of embodiment 7.

While FIG. 13 shows that the receiving member is disposed on the current-collecting member side, the conductive connecting member 15 may be disposed on the receiving member side as shown in FIG. 14. Further, in embodiments 3, 4, 5, and 6, the connection to the external output terminal may be made through a member other than the first current-collecting member.

(Embodiment 8)

In Embodiment 8, the External Output Terminal, the Sealing Plate, and the first current-collecting member are first assembled, and then the first current-collecting member and the connecting-type second current-collecting member are resistive-welded onto the electrode assembly. Then, the connecting-type second current-collecting member is resistive-welded onto the first current-collecting member. The production process of the positive electrode current collecting system is explained below using FIGS. 15 to 20. Also in the negative electrode, members having the same shape may be used.

Figure 15:
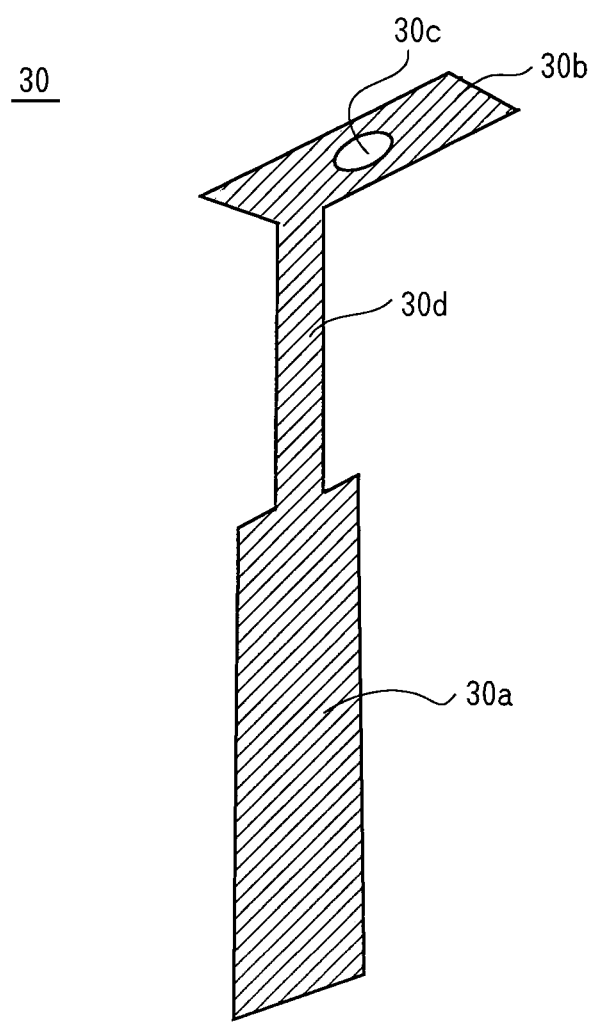
FIG. 15 is a perspective view showing a shape of a positive first electrode current-collecting member according to embodiment 8.

FIG. 15 is a perspective view of a first current-collecting member 30. The first current-collecting member 30 is an L-shaped current-collecting member when viewed from the front and processed from an aluminum plate. The first current-collecting member 30 includes a body portion 30a to be welded onto the core-body exposed portion of the electrode body, a head portion 30b to be connected to the external output terminal 5, and a neck portion 30d for connecting the body portion 30a and the head portion 30b. The head portion 30b is provided with an attachment hole 30c for caulking a lower end of the external output terminal 5.

Figure 16:
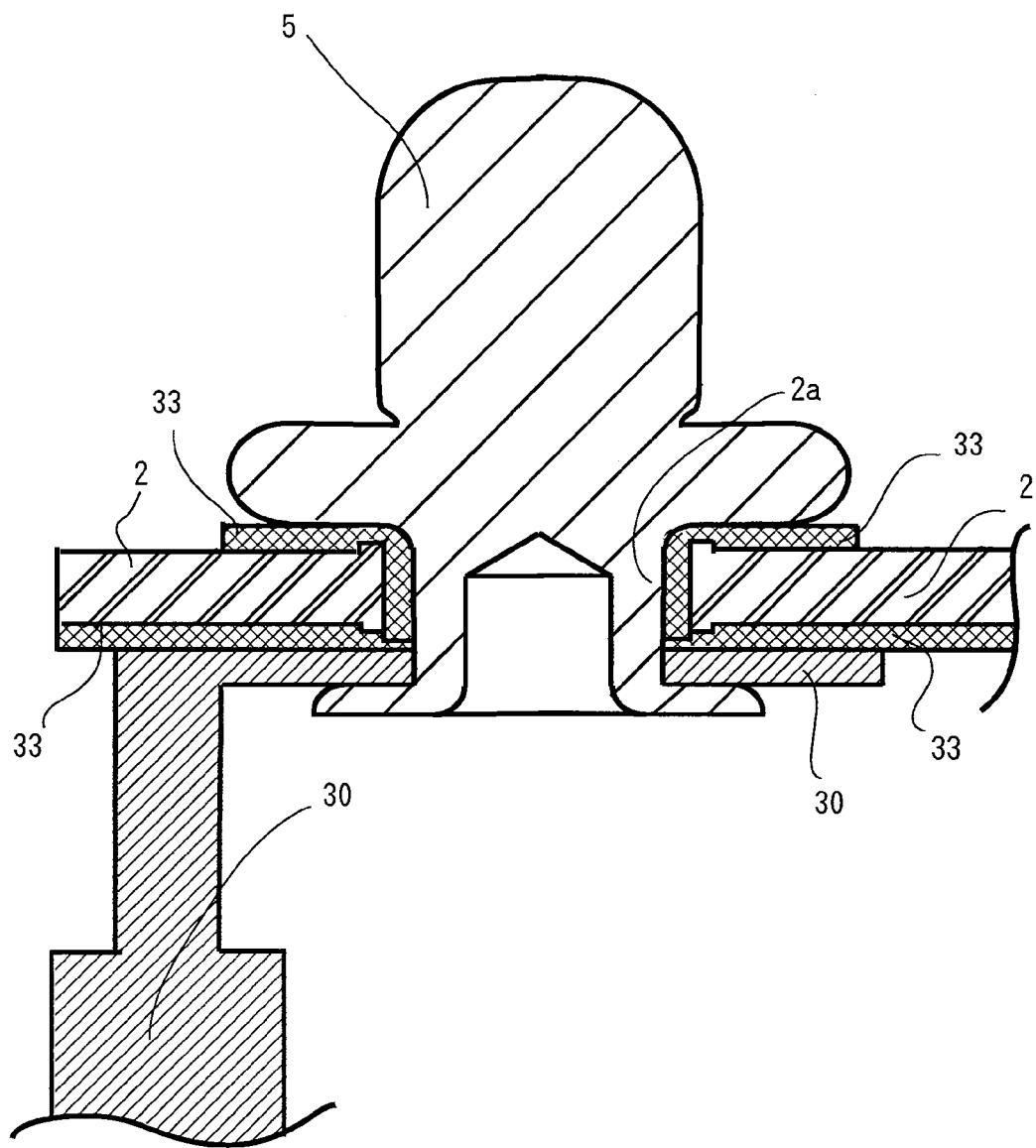
FIG. 16 is a schematic cross-sectional view showing a portion of a sealing body having an external output terminal and the first current-collecting member attached to a sealing plate.

FIG. 16 shows a cross-sectional view of the sealing body with the external output terminal 5, an insulating member 33, and the first current-collecting member 30 attached to the sealing plate 2 and integrated. As shown in FIG. 16, the insulating member 33 is disposed between the lower surface of the sealing plate 2 and the first current-collecting member 30, between the upper surface of the sealing plate 2 and the peripheral flange portion of the external output terminal 5, and on the periphery of a through hole 2a provided in the sealing plate 2. Thus, the insulating member 33 insulates among the sealing plate 2, the first current-collecting member 30 and the external output terminal 5.

The assembly of the sealing body is carried out in the following manner. The insulating member 33 is disposed at a predetermined portion of the sealing plate 2. On an insulating member located on the inner side of the sealing plate 2, the through hole 2a of the sealing plate 2 and the attachment hole 30c of the first current-collecting member 30 are superposed onto one another. Then, the external output terminal 5 is inserted through the through hole 2a and the attachment hole 30c of the first current-collecting member 30. With this state, a lower portion of the external output terminal 5 is enlarged in diameter, and the external output terminal 5 is fixed to the sealing plate 2 by caulking together with the first current-collecting member 30. Thus, the members are integrated, and the external output terminal 5 is connected to the first current-collecting member 30 in a conductible manner.

The first current-collecting member 30 fixed to the sealing plate 2 together with the external output terminal 5 in the above manner will be referred to as an external-output-terminal-connected first current-collecting member.

Figure 17:
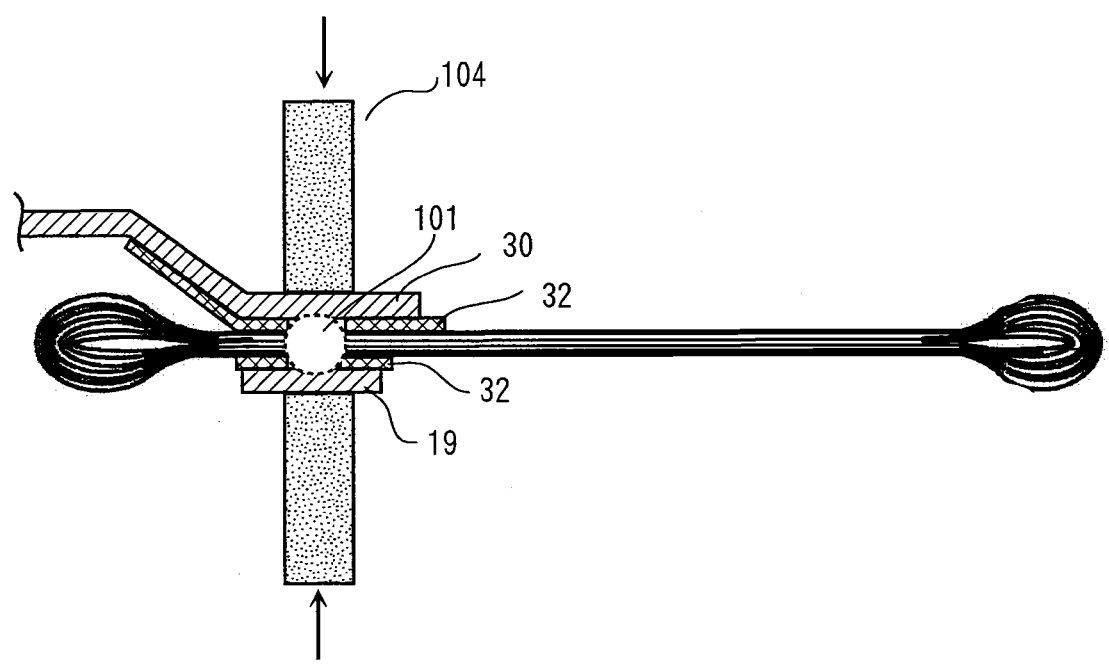
FIG. 17 is a diagram showing resistive-welding of the first current-collecting member onto a laminated core-body exposed portion according to embodiment 8.
Figure 18:
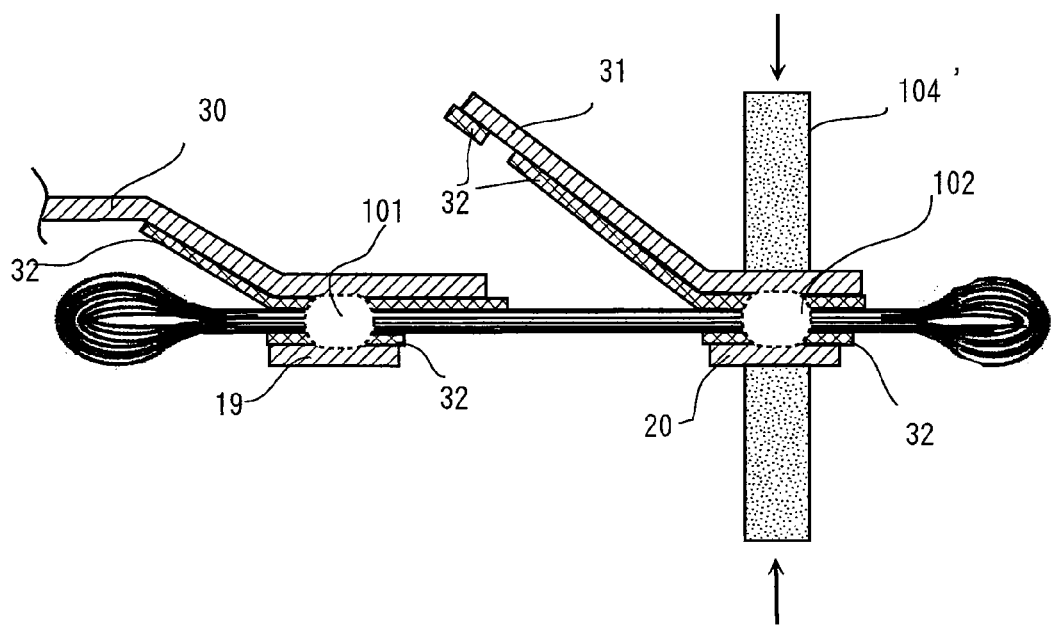
FIG. 18 is a diagram showing resistive-welding of the connecting-type second current-collecting member onto the laminated core-body exposed portion according to embodiment 8.
Figure 19:
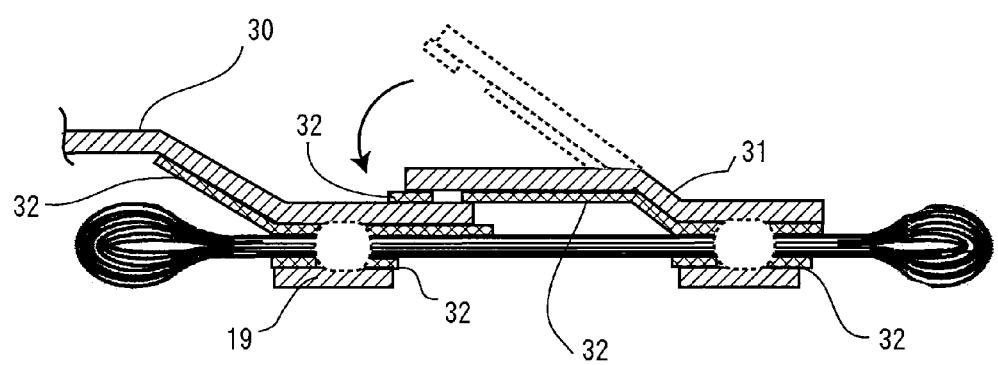
FIGS. 19A and 19B are diagrams showing resistive-welding of the first current-collecting member and the connecting-type second current-collecting member according to embodiment 8.
Figure 19:
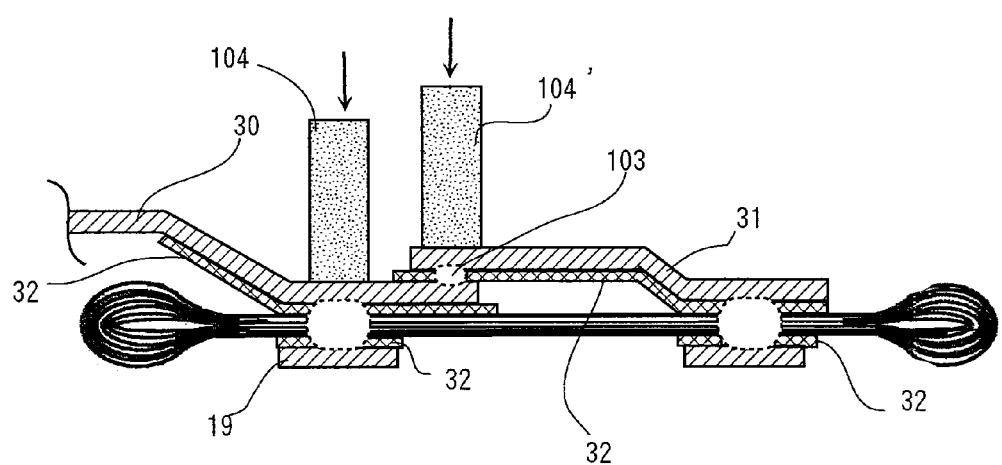

Referring to FIGS. 17 through 19, a process of attaching the current-collection members to the electrode assembly will be described. As shown in FIG. 17, the periphery of the first to-be-welded portion 101 of the core-body exposed portion of the electrode assembly is covered with an insulating film 32 except for a portion of one surface of the body portion 30a of the external-output-terminal-connected first current-collecting member 30 (the surface on the side that is to be brought into contact with the core-body exposed portion of the electrode assembly) that is to be brought into contact with the first to-be-welded portion 101 and welded. The insulating film 32 is also adhered to one surface of the first receiving member 19 except for a portion thereof that is to be brought into contact with the first to-be-welded portion 101 and welded.

The body portion 30a of the first current-collecting member 30 attached with the insulating film 32 is disposed on the center-left side of the flat portion of the laminated core-body exposed portion 11c (see FIGS. 2 and 3), while on the opposite surface, the first receiving member 19 attached with the insulating film 32 is disposed in an opposing manner. Then, the electrode bars 104 are brought into contact with the surface of the body portion 30a of the first current-collecting member and the member 19 to allow a current to flow between the members. Thus, the body portion 30a of the first current-collecting member, the laminated core-body exposed portion 11c, and the first receiving member 19 are resistive-welded together.

Figure 20:
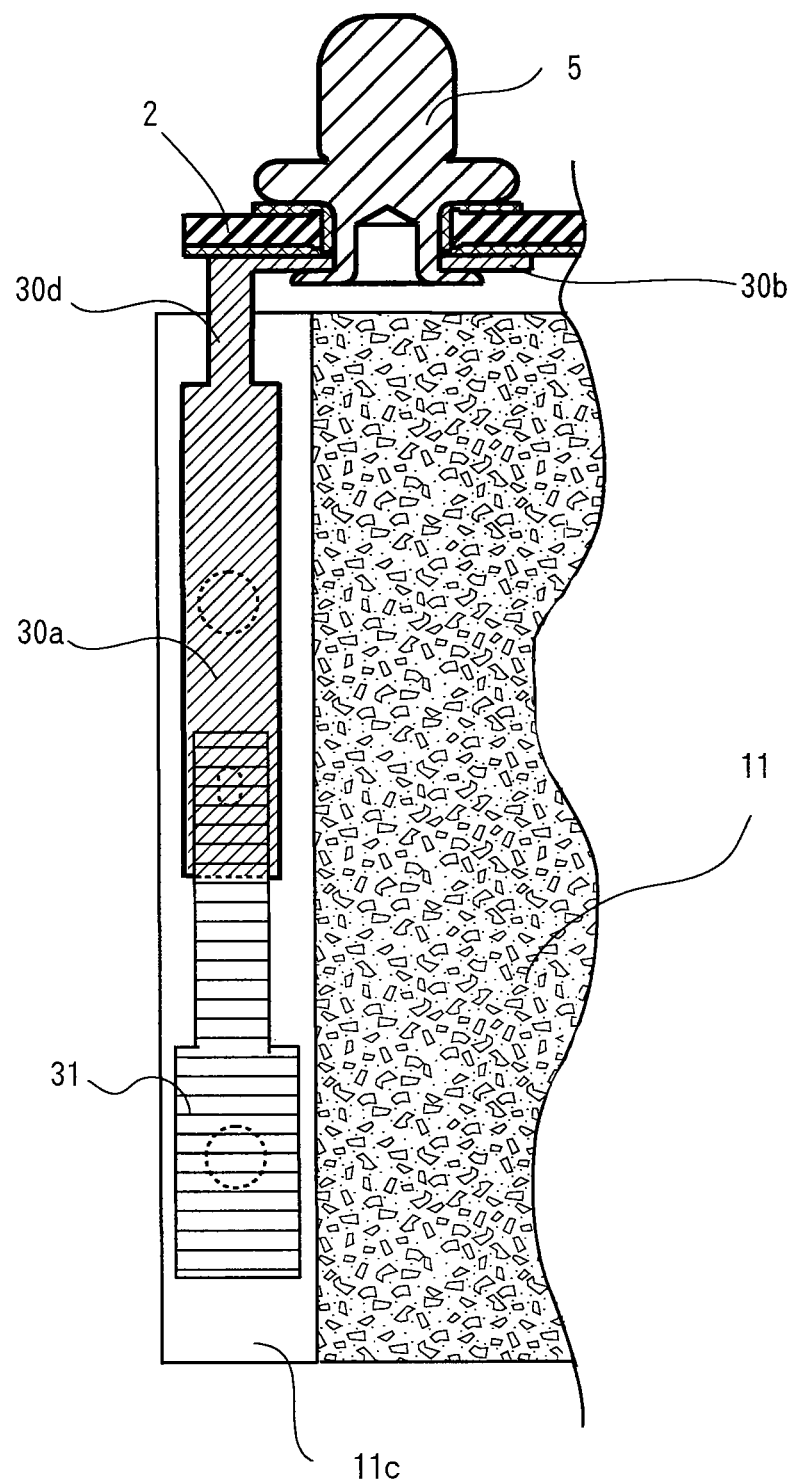
FIG. 20 is a schematic cross-sectional view of a cell according to embodiment 8.

Next, a connecting-type second current-collecting member 31 is resistive-welded onto an area of the laminated core-body exposed portion 11c which is distanced from the first current-collecting member. As showing in the frontal view in FIG. 18, the connecting-type second current-collecting member 31 used in the present embodiment is bent upward to form a chevron on the side connected to the first current-collecting member, and is in the form of a strip with the side connected to the first current-collecting member made slightly small in width, as shown in the plan view in FIG. 20. FIG. 20 is a schematic cross-sectional view of the current-collection structure according to embodiment 8, the cross-section being on the X-X arrow shown in FIG. 1.

The connecting-type second current-collecting member 31 is similar to the case of the first current-collecting member. Specifically, an insulating film 32 is adhered to a surface facing the side of the laminated core-body exposed portion 11c except for a portion that is to be brought into contact with the second to-be-welded portion 102 of the core-body exposed portion of the electrode assembly and welded. The insulating film 32 is also adhered to one surface of the second receiving member 20 except for a portion thereof that is to be brought into contact with the second to-be-welded portion 102 and welded.

Next, the connecting-type second current-collecting member 31 attached with the insulating film 32 and the second receiving member 20 attached with the insulating film 32 are applied onto an area of the laminated core-body exposed portion 11c distanced from the first current-collecting member, and electrically resistive-welded as shown in FIG. 18.

Then, as shown in FIG. 19A, the chevron-shaped tip portion of the connecting-type second current-collecting member 31 is pressed from upward and brought into contact with the upper surface of the body portion 30a of the first current-collecting member. With this state, electrode bars 104' are brought into contact with the first current-collecting member 30 and the connecting-type second current-collecting member 31, as shown in FIG. 19B, to allow a current to flow between the members, thereby electrically resistive-welding the members. Thus, the electrode assembly (positive electrode), the connecting-type second current-collecting member 31, the first current-collecting member 30, and the external output terminal 5 are connected together in a conductible manner.

The order of connecting the first current-collecting member and the second current-collecting member is not specified, and therefore it is possible that after the connecting-type second current-collecting member is resistive-welded onto the core-body exposed portion, the external-output-terminal-connected first current-collecting member is resistive-welded onto the core-body exposed portion, and then the members are resistive-welded together. The other respects than those specified above, such as the material of the current collection-related members and the production method, may be as described in embodiment 1 and other embodiments.

It should be noted, however, that the insulating film used in the present embodiment is mainly for preventing unnecessary consumption of current caused by contact between members during the electrical resistive welding, and therefore should be adhered to the members prior to the electrical resistive welding.

The material of the insulating film is preferably a thermoplastic insulating film having a melting temperature of 200° C. or higher, an adhesion temperature of 70 to 150° C., and chemical resistance against the electrolyte. Examples that meet these conditions include rubber sealing materials, acid-modified polypropylene thermoplastic resins, and polyolefin thermoplastic resins. Further examples include a glue-attached polyimide tape, a glue-attached polypropylene tape, and a glue-attached polyphenylene sulfide tape.

EXAMPLES

Description will be made of the excellent current collectivity of the prismatic secondary cell according the embodiments of the present invention by referring to examples.

Example 1

Similarly to embodiment 3, a prismatic lithium secondary cell according to example 1 was prepared.

Example 2

Similarly to embodiment 4, a prismatic lithium secondary cell according to example 2 was prepared.

Comparative Example 1

Figure 21:
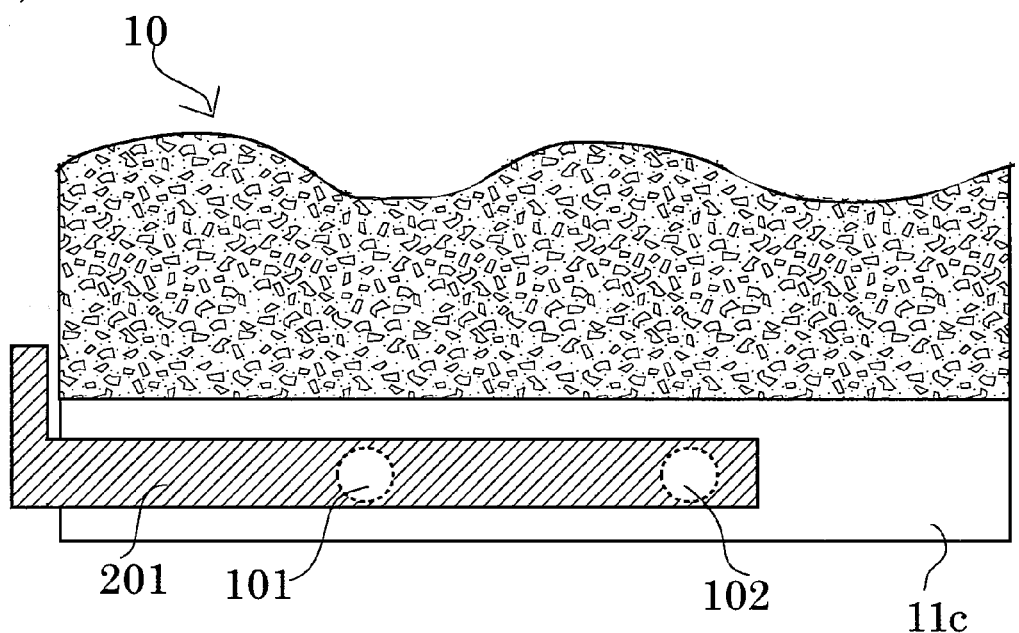
FIG. 21A is a schematic frontal view of a flat electrode assembly attached with a current-collecting body according to comparative example 1.
FIG. 21B is a schematic cross-sectional view of the flat electrode assembly.
Figure 21:
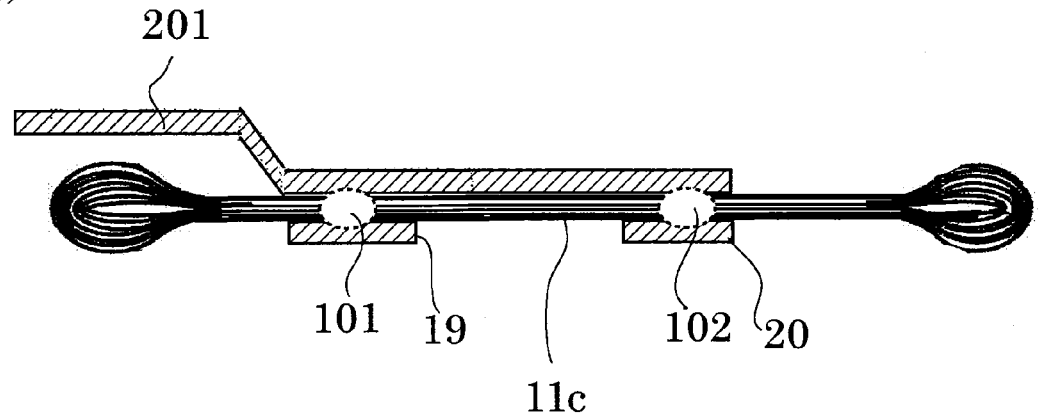

A prismatic lithium secondary cell according to a conventional example as shown in FIGS. 21A and 21B was produced. Specifically, a current-collecting plate 201 of a conventional type was resistive-welded onto the flat portion of the laminated core-body exposed portion 11c at two portions, namely, a welded portion 1 and a welded portion 2. A prismatic lithium secondary cell according to comparative example 1 was prepared in a similar manner to example 1, i.e., embodiment 3, in the other respects than the respect specified above.

Comparative Example 2

Figure 22:
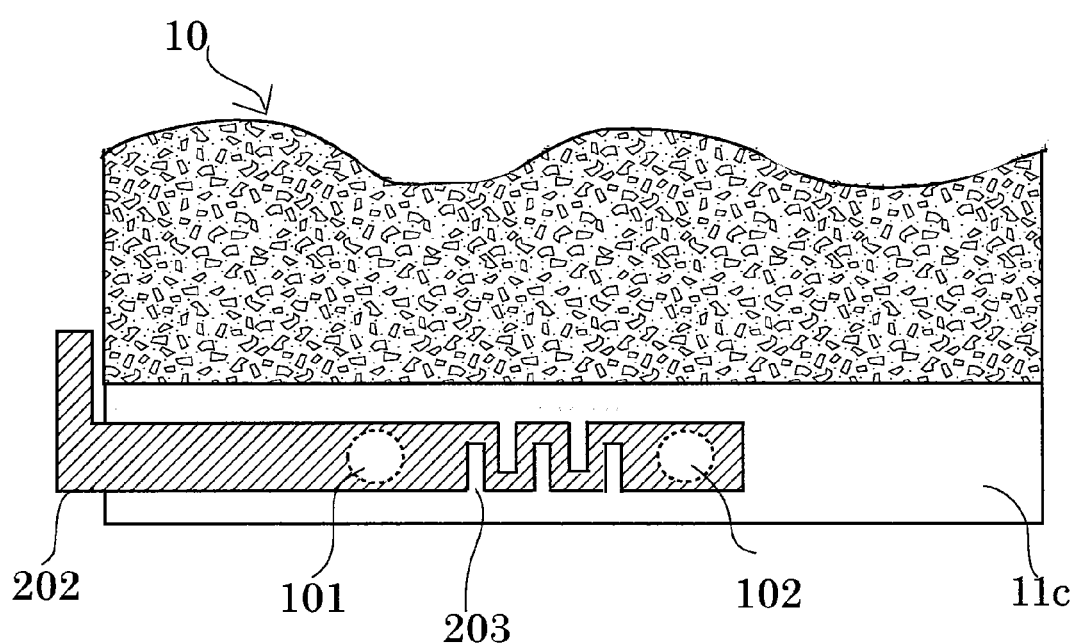
FIG. 22 is a schematic frontal view of a flat electrode assembly attached with a current-collecting body formed with slits according to comparative example 2.

As shown in FIG. 22, a current-collecting member 202 was used having notches 203 (slits) made between the first to-be-welded portion 101 and the second to-be-welded portion 102 in alternately different directions. The current-collecting member 202 was resistive-welded onto the flat portion of the laminated core-body exposed portion 11c at two portions, namely, the first to-be-welded portion 101 and the second to-be-welded portion 102. A prismatic lithium secondary cell according to comparative example 2 was prepared in a similar manner to example 1 (embodiment 3) in the other respects than the respect specified above.

Comparative Example 3

Figure 23:
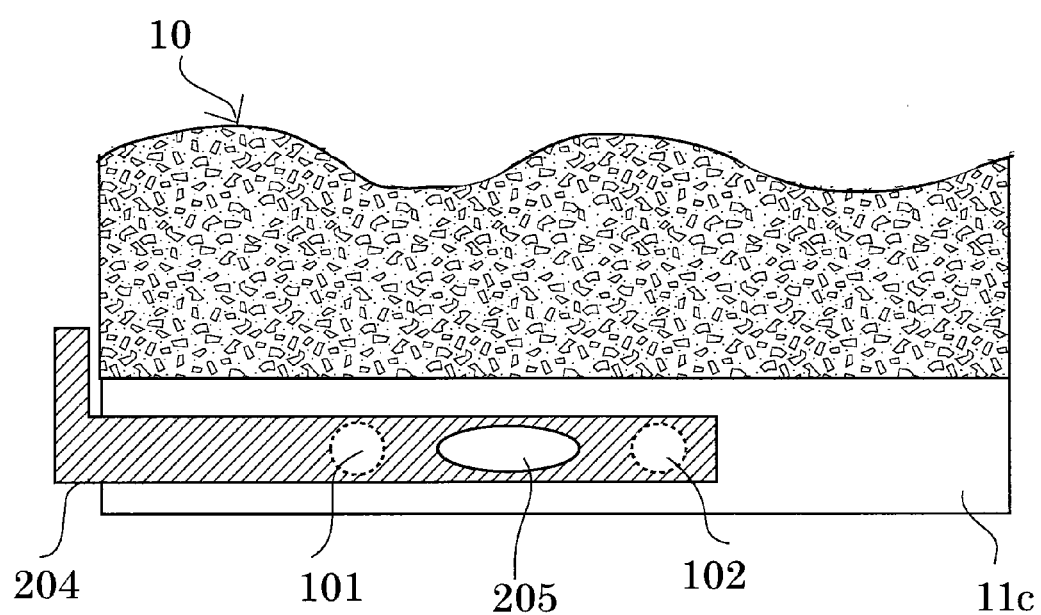
FIG. 23 is a schematic frontal view of a flat electrode assembly attached with a current-collecting body formed with an aperture portion according to comparative example 3.
Figure 24:
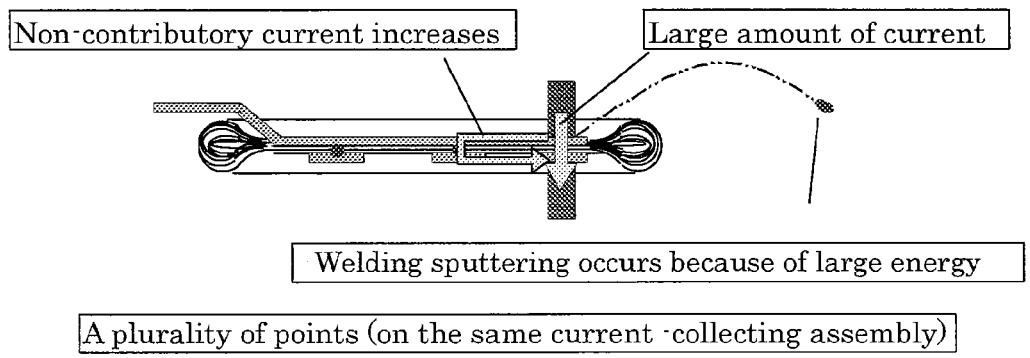
FIG. 24 is a diagram illustrating why non-contributory current occurs during resistive-welding of a conventional current-collecting plate.

As Shown in FIG. 23, a Current-Collecting Member 204 was Used having a hole portion 205 made between the first to-be-welded portion 101 and the second to-be-welded portion 102. The current-collecting member 204 was resistive-welded onto the flat portion of the laminated core-body exposed portion 11c at two portions, namely, the first to-be-welded portion 101 and the second to-be-welded portion 102. A prismatic lithium secondary cell according to comparative example 3 was prepared in a similar manner to example 1 (embodiment 3) in the other respects than the respect specified above.

The members used in examples 1 and 2 and comparative examples 1 to 3 were the same in material, thickness, and width.

Welding States

A plurality of cells were prepared for each of examples 1 and 2 and comparative examples 1 to 3, and electrical resistance values of the current collection system were examined. Also the second welded portion (the welded portion between the second current-collecting member and the second receiving member) was examined for whether the welding strength was good or bad. The welding strength was determined by whether the second current-collecting member and the second receiving member moved when touched by hand for examples 9 to 13. When the members moved, such case was determined as insufficient in strength. The results are shown in Table 1.

parative examples 1 to 3 is because during welding of the second to-be-welded portion in comparative examples 1 to 3, a non-contributory current flows through the first to-be-welded portion that has been already welded, which makes the welding of the second to-be-welded portion insufficient, resulting in a lack of welding strength. Although comparative examples 2 and 3 are provided with slits and hole portions, respectively, between the first to-be-welded portion and the second to-be-welded portion in order to reduce flow of current in the horizontal direction (directions between the first to-be-welded portion and the second to-be-welded portion), it is believed from the results shown in Table 1 that the provision of the slits and hole portions cannot make non-contributory current sufficiently small. It is believed that the significantly high resistance value observed in comparative example 2, in which slits are provided between the first to-be-welded portion and the second to-be-welded portion, is because the provision of the slits causes a narrow and long conductive pathway to be formed, which increases the resistance value.

Supplementary Remarks

While use of aluminum or an aluminum alloy for the electrode core body of the first electrode, the first current-collecting member (or connecting-type first current-collecting member), the second current-collecting member (or connecting-type second current-collecting member), and the conductive connecting member according to the embodiments of the present invention makes the advantageous effects of the present invention significant, these members may be other metal. While in the above embodiments the member of the positive electrode is made of aluminum and the members of the negative electrode is made of copper, the materials of the

TABLE 1

| | | Resistance value [mΩ] | Insufficient/total number of second welded portions |
|---|---|---|---|
| Example 1 | Present invention Resistive welded portions: 3 | 0.252 | 0/13 |
| Example 2 | Present invention Resistive welded portions: 3 (one electrode bar was inserted through a notch portion) | 0.218 | 0/13 |
| Comparative Example 1 | One current-collecting plate was used. Resistive welded portions: 2 | 0.193 | 1/10 |
| Comparative Example 2 | One current-collecting plate with slits was used. Resistive welded portions: 2 | 0.980 | 1/10 |
| Comparative Example 3 | One current-collecting plate with a hole portion was used. Resistive welded portions: 2 | 0.183 | 2/19 |

Table 1 shows that the resistance value was low in examples 1 and 2 and comparative examples 1 and 3, and high in comparative example 2. Regarding the welding strength, no insufficiency in welding strength was observed in examples 1 and 2, whereas insufficiency in welding strength existed in comparative examples 1 to 3.

Specifically, in examples 1 and 2, a preferable resistance value (current-collecting efficiency) equivalent to that in comparative example 1, which used one current-collecting plate, was obtained. Contrarily, in comparative examples 1 to 3, insufficiency in welding strength was occasionally observed, and thus the welding stability was insufficient as compared with examples 1 and 2. Also, comparative example 2 had a significantly high resistance value.

The results can be considered in the following manner. It is believed that the lack of welding strength observed in comelectrode bore body are determined according to the properties of the electrodes, and therefore the materials of the members will not be limited to the examples of the above embodiments.

While in the above embodiments the current collection-related structure according to the present invention is used for the positive and negative electrodes, the method according to the present invention may be used for one electrode.

The present invention is not limited to lithium ion secondary cells, but can be applied to production of nicked-hydrogen storage cells, nickel-cadmium storage cells, and the like. While in the above embodiments description is made of the example of a flat wound electrode assembly, the present invention can be applied to prismatic secondary cells in which flat-plate positive and negative electrode plates are laminated onto one another with a separator therebetween.

It is also possible to provide protruding portions for welding onto portions of the members of the present invention to be brought into contact with the welding electrode bars. Providing protruding portions facilitates concentration of current to welded portions.

INDUSTRIAL APPLICABILITY

The present invention employs such a system that a current-collection system is configured by sequentially welding a plurality of members. The method according to the present invention that sequentially welds a plurality of members realizes a good productive production of high-output prismatic secondary cells excellent in current-collecting stability and current-collecting efficiency. Thus, the industrial applicability of the present invention is considerable.

What is claimed is:

1. A method for producing a prismatic secondary cell, the prismatic secondary cell including: a flat electrode assembly having such a shape that a core-body exposed portion of a first electrode and a core-body exposed portion of a second electrode having a different polarity from a polarity of the first electrode protrude from a pair of opposing first and second edges of the flat electrode assembly; a prismatic cell case housing the flat electrode assembly; a sealing plate for sealing the prismatic cell case; and an external output terminal inserted through a through hole provided in the sealing plate and protruding outwardly from an inside of the cell, the external output terminal being connected to the first electrode in a conductible manner, the method comprising:

an A step of disposing a first current-collecting member onto a first to-be-welded portion set at a flat portion of the first edge of the electrode assembly from which the core-body exposed portion of the first electrode protrudes, and resistive-welding the first current-collecting member and the core-body exposed portion of the first electrode together from a direction substantially perpendicular to a plane of the core-body exposed portion of the first electrode;

a B step of disposing a second current-collecting member onto a second to-be-welded portion set at a position of the flat portion, the position being distanced from the first to-be-welded portion so that the first current-collecting member and the second current-collecting member do not come into contact with one another, and resistive-welding the second current-collecting member and the core-body exposed portion of the first electrode together from the direction substantially perpendicular to the plane of the core-body exposed portion of the first electrode; and a C step of, after completion of the above two steps, connecting the first current-collecting member and the second current-collecting member to one another in a conductible manner directly or through a conductive connecting member other than the core-body exposed portion of the first electrode, wherein one of the first current-collecting member and the second current-collecting member protrudes from a third edge of the flat electrode assembly, the third edge being on the sealing plate side; and an other of the first current-collecting member and the second current-collecting member does not protrude from the third edge of the flat electrode assembly, the third edge being on the sealing plate side.

2. The method for producing a prismatic secondary cell according to claim 1, wherein in the A step and the B step, the first current-collecting member and the second current-collecting member are connected to an outermost surface of the flat portion of the core-body exposed portion of the first electrode which is wound or laminated.

3. The method for producing a prismatic secondary cell according to claim 2, wherein a connecting-type second current-collecting member having an extending portion is used as the second current-collecting member, and wherein in the B step, a main portion of the connecting-type second current-collecting member is disposed onto the second to-be-welded portion set at the position of the flat portion distanced from the first to-be-welded portion so that the first current-collecting member and the connecting-type second current-collecting member do not come into contact with one another; and the extending portion of the connecting-type second current-collecting member is disposed at the first current-collecting member in a non-contact manner; and in the C step, the extending portion of the connecting-type second current-collecting member and the first current-collecting member are brought into contact with one another and then welded together.

4. The method for producing a prismatic secondary cell according to claim 2, wherein the first current-collecting member protrudes from the third edge of the flat electrode assembly, the edge being on the sealing plate side; and the second current-collecting member does not protrude from the third edge of the flat electrode assembly, the third edge being on the sealing plate side, and wherein the method further comprises, prior to the A step, a step of connecting the external output terminal and the first current-collecting member together in a conductible manner.

5. The method for producing a prismatic secondary cell according to claim 2, wherein in the A step, a first receiving member is disposed onto a position opposing the first current-collecting member with the core-body exposed portion of the first electrode disposed therebetween; and the first current-collecting member, the core-body exposed portion of the first electrode, and the first receiving member are resistive-welded together, with the core-body exposed portion of the first electrode held between the first current-collecting member and the first receiving member.

6. The method for producing a prismatic secondary cell according to claim 2, wherein in the B step, a second receiving member is disposed onto a position opposing the second current-collecting member with the core-body exposed portion of the first electrode disposed therebetween; and the second current-collecting member, the core-body exposed portion of the first electrode, and the second receiving member are resistive-welded together, with the core-body exposed portion of the first electrode held between the second current-collecting member and the second receiving member.

7. The method for producing a prismatic secondary cell according to claim 2, wherein a connecting-type second current-collecting member having an extending portion is used as the second current-collecting member; wherein the C step comprises resistive-welding the extending portion of the connecting-type second current-collecting member onto an upper surface of the first current-collecting member to connect the first current-collecting member and the connecting-type second current-collecting member to one another in a conductible manner; and wherein prior to the resistive-welding of the extending portion of the connecting-type second current-collecting member onto the upper surface of the first current-collecting member, an insulating film is provided onto resistive-welded side surfaces of the first current-collecting member and the connecting-type second current-collecting member excluding at least a portion of the first current-collecting member to come into contact with the first to-be-welded portion, a portion of the connecting-type second current-collecting member to come into contact with the second to-be-welded portion, and a portion of the extending portion of the connecting-type second current-collecting member to be resistive-welded onto the first current-collecting member.

8. The method for producing a prismatic secondary cell according to claim 2, wherein
a connecting-type first current-collecting member having an extending portion is used as the first current-collecting member; and wherein
in the C step, the extending portion of the connecting-type first current-collecting member and the second current-collecting member are brought into contact with one another and then welded together.

9. The method for producing a prismatic secondary cell according to claim 2, wherein
a connecting-type first current-collecting member having an extending portion is used as the first current-collecting member; and
a connecting-type second current-collecting member having an extending portion is used as the second current-collecting member, and wherein
in the B step, a main portion of the connecting-type second current-collecting member is disposed onto the second to-be-welded portion set at the position of the flat portion distanced from the first to-be-welded portion so that the connecting-type first current-collecting member and the connecting-type second current-collecting member do not come into contact with one another; and
the extending portion of the connecting-type second current-collecting member is disposed at the extending portion of the connecting-type first current-collecting member in a non-contact manner, and
in the C step, the extending portion of the connecting-type first current-collecting member and the extending portion of the connecting-type second current-collecting member are brought into contact with one another and then welded together.

10. The method for producing a prismatic secondary cell according to claim 2, wherein
in the C step, a conductive connecting member is connected to each of the first current-collecting member and the second current-collecting member.

11. A method for producing a prismatic secondary cell, the prismatic secondary cell including: a flat electrode assembly having such a shape that a core-body exposed portion of a first electrode and a core-body exposed portion of a second electrode having a different polarity from a polarity of the first electrode protrude from a pair of opposing first and second edges of the flat electrode assembly; a prismatic cell case housing the flat electrode assembly; a sealing plate for sealing the prismatic cell case; and an external output terminal connected to the first electrode in a conductible manner, the flat electrode assembly being a wound electrode assembly, the core-body exposed portion of the first electrode being wound, the method comprising:

an A step of disposing a first current-collecting member onto a first to-be-welded portion set on an outermost surface of a flat portion of the wound core-body exposed portion of the first electrode; and resistive-welding the first current-collecting member and the core-body exposed portion of the first electrode together;

a B step of disposing a second current-collecting member onto a second to-be-welded portion set at a position on the outermost surface of the flat portion, the position being distanced from the first to-be-welded portion so that the first current-collecting member and the second current-collecting member do not come into contact with one another, and resistive-welding the second current-collecting member and the core-body exposed portion of the first electrode together-and a C step of, after completion of the above two steps, connecting the first current-collecting member and the second current-collecting member to one another in a conductible manner directly or through a conductive connecting member other than the core-body exposed portion of the first electrode, wherein one of the first current-collecting member and the second current-collecting member protrudes from a third edge of the flat electrode assembly, the third edge being on the sealing plate side, and an other of the first current-collecting member and the second current-collecting member does not protrude from the third edge of the flat electrode assembly, the third edge being on the sealing plate side.

12. The method for producing a prismatic secondary cell according to claim 11, wherein
a connecting-type second current-collecting member having an extending portion is used as the second current-collecting member, and wherein
in the B step, a main portion of the connecting-type second current-collecting member is disposed onto the second to-be-welded portion set at the position on the outermost surface of the flat portion distanced from the first to-be-welded portion so that the first current-collecting member and the connecting-type second current-collecting member do not come into contact with one another; and
the extending portion of the connecting-type second current-collecting member is disposed at the first current-collecting member in a non-contact manner; and
in the C step, the extending portion of the connecting-type second current-collecting member and the first current-collecting member are brought into contact with one another and then welded together.

13. The method for producing a prismatic secondary cell according to claim 11, wherein
the first current-collecting member protrudes from the third edge of the flat electrode assembly, the third edge being on the sealing plate side; and
the second current-collecting member does not protrude from the third edge of the flat electrode assembly, the third edge being on the sealing plate side, and wherein
the method further comprises, prior to the A step, a step of connecting the external output terminal and the first current-collecting member together in a conductible manner.

14. The method for producing a prismatic secondary cell according to claim 11, wherein
in the A step, a first receiving member is disposed onto a position opposing the first current-collecting member with the core-body exposed portion of the first electrode disposed therebetween; and the first current-collecting member, the core-body exposed portion of the first electrode, and the first receiving member are resistive-welded together, with the core-body exposed portion of the first electrode held between the first current-collecting member and the first receiving member.

15. The method for producing a prismatic secondary cell according to claim 11, wherein
in the B step, a second receiving member is disposed onto a position opposing the second current-collecting member with the core-body exposed portion of the first electrode disposed therebetween; and
the second current-collecting member, the core-body exposed portion of the first electrode, and the second receiving member are resistive-welded together, with the core-body exposed portion of the first electrode held between the second current-collecting member and the second receiving member.

16. The method for producing a prismatic secondary cell according to claim 11, wherein
a connecting-type second current-collecting member having an extending portion is used as the second current-collecting member; wherein
the C step comprises resistive-welding the extending portion of the connecting-type second current-collecting member onto an upper surface of the first current-collecting member to connect the first current-collecting member and the connecting-type second current-collecting member to one another in a conductible manner; and wherein
prior to the resistive-welding of the extending portion of the connecting-type second current-collecting member onto the upper surface of the first current-collecting member, an insulating film is provided onto resistive-welded side surfaces of the first current-collecting member and the connecting-type second current-collecting member excluding at least a portion of the first current-collecting member to come into contact with the first to-be-welded portion, a portion of the connecting-type second current-collecting member to come into contact with the second to-be-welded portion, and a portion of the extending portion of the connecting-type second current-collecting member to be resistive-welded onto the first current-collecting member.

17. The method for producing a prismatic secondary cell according to claim 11, wherein
a connecting-type first current-collecting member having an extending portion is used as the first current-collecting member; and wherein
in the C step, the extending portion of the connecting-type first current-collecting member and the second current-collecting member are brought into contact with one another and then welded together.

18. The method for producing a prismatic secondary cell according to claim 11, wherein
a connecting-type first current-collecting member having an extending portion is used as the first current-collecting member; and
a connecting-type second current-collecting member having an extending portion is used as the second current-collecting member, and wherein
in the B step, a main portion of the connecting-type second current-collecting member is disposed onto the second to-be-welded portion set at the position on the outermost surface of the flat portion distanced from the first to-be-welded portion so that the connecting-type first current-collecting member and the connecting-type second current-collecting member do not come into contact with one another; and
the extending portion of the connecting-type second current-collecting member is disposed at the extending portion of the connecting-type first current-collecting member in a non-contact manner, and
in the C step, the extending portion of the connecting-type first current-collecting member and the extending portion of the connecting-type second current-collecting member are brought into contact with one another and then welded together.

19. The method for producing a prismatic secondary cell according to claim 11, wherein
in the C step, a conductive connecting member is connected to each of the first current-collecting member and the second current-collecting member.

* * * * *